United States Patent [19]

Yatsu et al.

[11] Patent Number: 5,048,939
[45] Date of Patent: Sep. 17, 1991

[54] ZOOM LENS SYSTEM

[75] Inventors: Masahiko Yatsu; Masaharu Deguchi; Takesuke Maruyama; Hironobu Satoh; Kenji Kobayashi; Kenji Sano, all of Kanagawa, Japan

[73] Assignee: Hitachi, Ltd., Tokyo, Japan

[21] Appl. No.: 510,284

[22] Filed: Apr. 17, 1990

[30] Foreign Application Priority Data

Apr. 21, 1989 [JP] Japan .................................. 1-100009
Aug. 9, 1989 [JP] Japan .................................. 1-204637
Aug. 9, 1989 [JP] Japan .................................. 1-204656

[51] Int. Cl.$^5$ ............................................. G02B 15/14
[52] U.S. Cl. ................................... 359/683; 359/676; 359/708
[58] Field of Search ................. 350/423, 427, 432, 435

[56] References Cited

U.S. PATENT DOCUMENTS 4,720,181 1/1988 Hata ..................................... 350/427

Primary Examiner—Scott J. Sugarman
Attorney, Agent, or Firm—Antonelli, Terry, Stout & Kraus

[57] ABSTRACT

A zoom lens system comprises, from an objective sequentially, a first lens group (1) having a positive power, a second lens group and a third lens group (2) and (3) having negative power and performing a zooming function by moving along an optical axis, a fourth lens group (4) having a positive power and being always stationary, and a fifth lens group (5) having a positive power and having a triplet structure including, from an object side sequentially, a first lens (9) having a positive power, a second meniscus lens (10) having a negative power and a third lens (11) having a positive power, the fourth lens group including a lens at least one surface of which is aspherical, the first or the fifth lens group being movable as a whole or partially along an optical axis to perform a focusing function. The first, second and third lens groups satisfy the following conditions:

$$2.7 < |f_I/f_{II}| < 3.6$$

$$1.0 < |f_I/f_{III}| < 1.9$$

$$3.8 < f_I/f_W < 4.9$$

where $f_I$ is a focal length of the first lens group, $f_{II}$ is a focal length of the second lens group, $f_{III}$ is a focal length of the third lens group, and $f_W$ is a focal length of the whole system at a wide-angle end of the zoom lens.

11 Claims, 21 Drawing Sheets

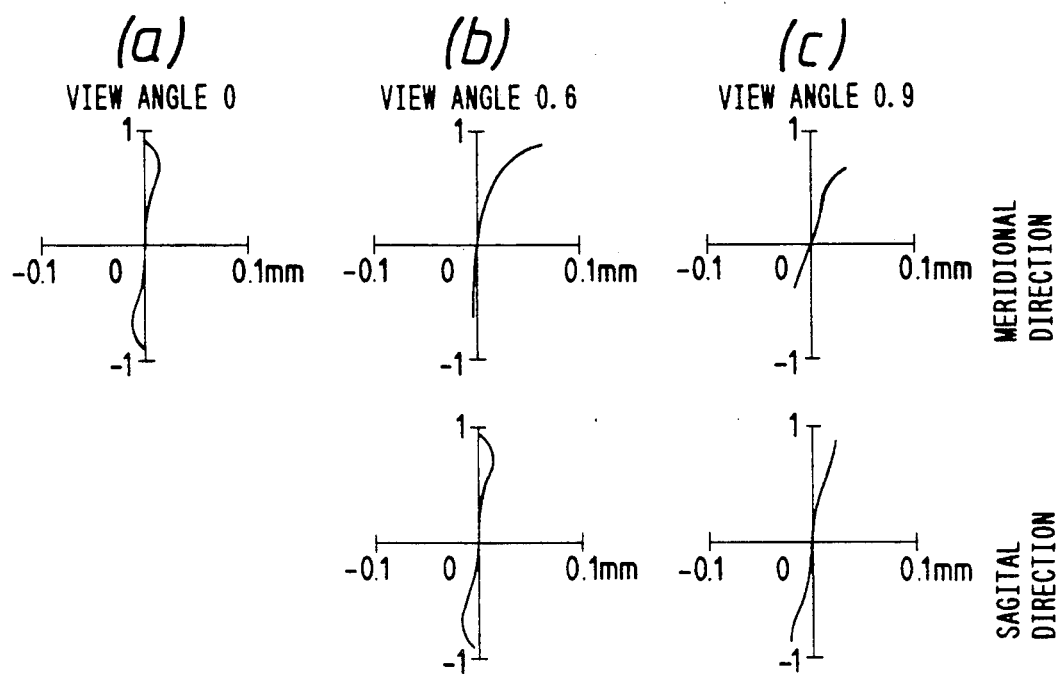
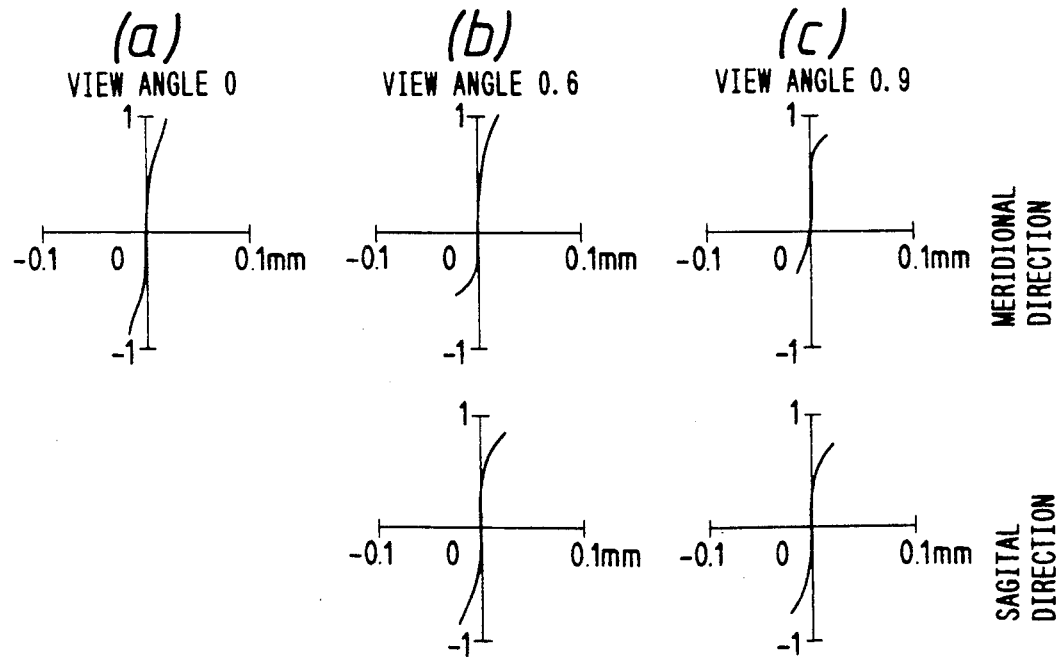

ZOOM LENS SYSTEM

BACKGROUND OF THE INVENTION

The present invention relates to a compact and high power zoom lens system and, particularly, to a compact zoom lens system having small total length and suitable to use in a video camera or the like.

A number of compact zoom lens systems which may be used in a video camera or the like have been proposed. For example, as disclosed in Patent Application Laid-open Nos. 59-28121, 61-140913, 61-182011 and 63-34505, etc., a zoom lens can be constituted with a relatively small number of lenses and thus can be made compact with high performance by applying an aspherical surface to the zoom lens system and suitably regulating focal lengths of lenses constituting the zoom lens.

In an example of the conventional zoom lens for a ½ inch image size having a zoom ratio of about 6, however, a ratio of the total length of the zoom lens to a focal length thereof at the wide-angle end is on the order of 11 to 12. Such zoom lens is not small enough to use in a recent video camera which is much more miniaturized.

Generally, in order to reduce a total length of a zoom lens, it is necessary to lower zoom ratio and/or make F number larger. When, in order to reduce the total length without reducing its power, the whole zoom lens system is made smaller analogously, focal lengths of respective lenses become shorter and radii of curvature thereof become smaller, necessarily. Therefore, problems such as larger lens diameter, difficulty of compensation of various aberrations, increased number of lenses and severe manufacturing tolerance of lenses, etc., may occur.

As mentioned before, when the total length of the zoom lens is reduced, various aberrations are enhanced and the desired performance can not be obtained. Further, in order to compensate for these degraded aberrations, it is necessary to increase the number of lenses, resulting in a necessity of providing a space for the increased lens number which may require an increase in the total length. Therefore, it is very important how to compensate these aberrations resulting from the shortened total length a minimum number of lenses.

An object of the present invention is to provide an improved zoom lens system which includes a minimum number of constituting lenses with good compensation for aberrations and which has a high power with a zoom ratio being on the order of 6, an F number of 1.4 to 1.8 at the wide-angle end, a ratio of a total length of the zoom lens to a focal length at the wide-angle end being on the order of 7 to 9.

SUMMARY OF THE INVENTION

According to the present invention, a zoom lens comprises, from an objective sequentially, a first lens group (1) having a positive power, a second lens group (2) and a third lens group (3) both having negative powers and performing a zooming function by moving along an optical axis, a fourth lens group (4) having a positive power, including a lens at least one surface of which is aspherical and being always stationary, an iris (7) disposed on either the object side or the image side of the fourth lens group, a fifth lens group (5) having a positive power, a quartz plate (6) and an image plane (8), in that order. The fifth lens group is of a triplet type including, from the object side, a first lens (9) having a positive power, a second meniscus lens (10) having a negative power and a third lens (11) having a positive power, in that order.

In the zoom lens according to the present invention, zooming is performed by moving the second lens group (2) and the third lens group (3) along an optical axis while keeping an image plane in a fixed position. Focusing is performed by moving the whole or a portion of the first lens group (1) or the fifth lens group (5) along the optical axis.

The fourth lens group (4) serves to make light which diverges from the third lens group (3), and is to be fallen in a center of the image plane afocal, or somewhat convergent at an exit side thereof, so that variation of view angle is restricted and the height of light passing through the fifth lens group is made as low as possible when the focusing is performed.

The iris is disposed in the vicinity of the fourth lens group (4) on the object or image plane side thereof so that light to be fallen in a center of the image plane passes through the fourth lens group (4) at a relatively high position. Therefore, the aspherical surface provided in the fourth lens group (4) serves to compensate for aberration of, particularly, light to be fallen in the center portion of the image plane.

Further, the fifth lens group (5) having the triplet construction serves, together with the aspherical surface of the fourth lens group (4), to sufficiently compensate for various aberrations of a zoom lens whose total length is minimized, with a minimum number of lenses. This will be described in detail later.

First, in order to shorten the total length of such zoom lens system, gaps between respective lenses on the optical axis should be as small as possible and thicknesses of these lenses should be as small as possible. However, the lens gap and lens thickness are generally important for freedom for aberration compensation and such reduction of lens gap and lens thickness may be disadvantageous for compensation of various aberrations. Therefore, in the past, these aberrations are corrected by increasing thicknesses of respective lenses of lens groups corresponding to the fourth lens group (4) and the fifth lens group (5), relatively increasing lens gaps between lenses corresponding to the fourth lens group (4) and the fifth lens group (5) and/or constituting a lens group corresponding to the fifth lens group (5) with two lens groups separated relatively largely on the optical axis, resulting in a relatively large total length.

It has been found that, in a zoom lens having small total length, a good aberration correction with a minimum number of lenses is realized by only a combination of the aspherical surface provided in the fourth lens group (4) and the triplet construction of the fifth lens group (5).

The construction according to the present invention, however, permits a good aberration correction with reduced lens gaps or lens thicknesses on the optical axis. As mentioned above, the aspherical surface provided in the fourth lens group (4) serves to correct spherical aberration mainly and the fifth lens group (5) having the triplet construction corrects mainly peripheral aberrations such as coma and astigmatism. However, since, in order to minimize the total length, the axial length of the fifth lens group (5) is made small, it is impossible to compensate for residual aberrations such as spherical aberration, etc. For this reason, the fifth lens group (5) serves to compensate specific aberrations such as coma and astigmatism, etc., mainly. Therefore, spherical aberration which can not be corrected by only the fifth lens group (5) is corrected in balance with the aspherical surface provided in the fourth lens group (4), to thereby provide an acceptable aberration compensation as a whole.

In the construction according to the first aspect of the present invention, the following conditions are to be satisfied.

$$2.7 < |f_I / f_{II}| < 3.6 \quad \text{(i)}$$

$$1.0 < |f_I / f_{III}| < 1.8 \quad \text{(ii)}$$

$$3.0 < f_I / f_W < 4.9 \quad \text{(iii)}$$

where $f_I$ is a focal length of the first lens group (1), $f_{II}$ is a focal length of the second lens group (2), $f_{III}$ is a focal length of the third lens group (3) and $f_W$ is a focal length of the whole system at a wide-angle end.

When the focusing is to be performed by the fifth lens group (5), the zoom lens construction should further satisfy the following condition:

$$0.13 < d_{IV,V} / f_V < 0.23 \quad \text{(iv)}$$

where $d_{IV,V}$ is a distance on an optical axis between a surface of the fourth lens group (4) closest to the focal plane and a surface of the fifth lens group (5) closest to the object when a photographing distance to the object is infinite and $f_V$ is a focal length of the fifth lens group (5).

As one of methods for reducing a total length of a zoom lens having five lens groups, it is considered to uniformly reduce focal lengths of the respective first to third lens groups (1) to (3). However, by increasing the focal lengths of the respective lens groups, radii of curvature of lenses of the respective lens groups are reduced, causing aberration to be increased. Further, tolerance of positioning of the respective lens groups becomes smaller which is undesirable for manufacturing. Further, when the focal lengths of the first to third lens groups (1) to (3) are reduced uniformly with same rate for the respective lens groups from those of the conventional system, light passing through the fourth lens group (4) and the fifth lens group (5) passes at a high level, so that outer diameters of the fourth lens group (4) and the fifth lens group (5) become larger or aberration increases. As the outer diameter of a lens increases the thickness of a center portion of the lens becomes larger to maintain the thickness of a peripheral portion of the lens, resulting in a larger lens system.

As another method for reducing the total length, it is considered to reduce intervals between lenses on an optical axis or to reduce the number of lenses. In such case, however, the freedom of compensation for aberration is reduced, resulting in a degraded performance.

The zoom lens of this invention eliminates such problems as above which result from the reduction of total length, by providing the lens system constituted as mentioned hereinbefore and satisfying the conditions (i) to (iii).

The condition (i) relates to a ratio in focal length between the first lens group (1) and the second lens group (2).

In a zoom lens according to the present invention, it is effective to make the focal length of the first lens group (1) which has a positive power smaller for minimization of the total length. When the focal length of the first lens group (1) is made smaller and the power is made larger, the distance along which the second lens group (2) is moved becomes smaller with the same zooming ratio and thus it is possible to reduce the distance between them along the optical axis and reduce the total length correspondingly.

Further, when the focal length of the first lens group (1) is made small, the height of light passing through the fourth lens group (4) is reduced and so it is possible to make the fourth lens group (4) and the fifth lens group (5) compact. However, when the focal length of the first lens group (1) is made too small with respect to that of the second lens group (2), a distance along which the third lens group (3) moves in zooming is increased, causing the total length to be larger, and positioning tolerance of the second lens group (2) on the optical axis is degraded. Further, the height of light in the first lens group (1), which passes through a center of the iris to the outermost periphery of the image plane, is increased, causing the diameter of the first lens group (1) to be large and thickness thereof on the optical axis is increased. Above the upper limit in the condition (i), the focal length of the first lens group (1) becomes large with respect to the second lens group (2), so that the total length increases and positioning tolerance of the third lens group (3) on the optical axis is degraded. Below the lower limit in the condition (i), which is very small compared with the conventional system to shorten the length, the focal length of the first lens group (1) is too small with respect to that of the second lens group (2), causing positioning tolerance of the second lens group (2) on the optical axis to be severe, and the height of light passing through the fourth lens group (4) becomes high, contrarily.

The condition (ii) relates to a ratio in focal length between the first lens group (1) and the third lens group (3). In order to shorten the total length, it is effective to reduce a focal length and increase the power of the third lens group (3) so that an amount of movement of the third lens group (3) in zooming becomes small. However, above the upper limit of the condition (ii), the height of light passing through the third lens group (3) to the fourth lens group (4) becomes undesirably large. Further, below the lower limit of the condition (ii), an amount of movement of the third lens group (3) in zooming becomes large. Outside the conditions (i) and (ii), it comes impossible to balance various aberrations occurring in the first lens group (1), the second lens group (2) and the third lens group (3) and, thus, variation of various aberrations due to zooming becomes large.

The condition (iii) defines absolute values in the conditions (i) and (ii). Above the upper limit, the focal length of the first lens group (1) becomes too large with respect to a focal length of a whole zoom lens system, causing the total length to be large. Below the lower limit, the focal length of the first lens group (1) becomes too small, causing the aberration variation and the positioning tolerance on the optical axis to be enhanced.

Therefore, it is important to determine focal lengths of the respective lens groups so that the height of light in the first lens group (1) and the fourth lens group (4) are made low and the amounts of shift of the second lens group (2) and the third lens group (3) are minimized, while the sensitivities thereof are maintained at practically acceptable values. Within the ranges defined by the conditions (i) to (iii), it is possible to maintain the positioning accuracy of the lens groups at practically acceptable values, to reduce the height of light passing through the first lens group (1) and the fourth lens group (4) to thereby make the zoom lens compact and reduce the total length thereof, and restrict variations of various aberrations due to zooming.

The condition (iv) defines the interval on the optical axis between the fourth lens group (4) and the fifth lens group when the latter is used for focusing. In order to reduce the total length, it is effective to make the fifth lens group (5) as close to the object as possible. Since, as mentioned before, light in the exit side of the fourth lens group (4) is set as substantially afocal, the distance between the fourth lens group (4) and the fifth lens group (5) on the optical axis becomes a dead space for the total length if freedom of aberration correction, etc., is neglected. Therefore, it is possible to shorten the total length by making this distance smaller. Since, however, the smaller distance makes the fifth lens group (5) be closer to the iris, this means that an exit pupil position becomes closer to the image plane, resulting in that it may become impossible to obtain a distance along which lenses should move in focusing. When a situation is below the lower limit of the condition (iv), it becomes impossible to obtain enough distance from the exit pupil to the image plane, and a cylinder member, etc., supporting the fifth lens group (5) collides with the iris when the whole fifth lens group (5) is moved for focusing. Above the upper limit of the condition (iv), a distance on the optical axis between the fourth lens group (4) and the fifth lens group (5) becomes too large, resulting in a larger total length.

As mentioned previously, in the zoom lens according to the present invention, zooming is performed by moving the second and the third lens groups along an optical axis and focusing is performed by moving the whole or a portion of the first lens group or the fifth lens group along the optical axis. In the latter case which is referred to as rear focus type and may be suitably used with the recent development of automatic focusing device, since the fourth lens group has a positive power and causes light diversing from the third lens group to be afocal (light incident on a center of an image plane being in parallel to the optical axis), or somewhat convergent at an output side thereof, the height of light incident on the fifth lens group (5) around the center of the image plane thereof is kept substantially constant by which, even when the lenses move during focusing, a variation of focal length of the whole zoom lens system, that is, a variation of image size is minimized. Further, with the constant height of light incident on the fifth lens group, it is possible to minimize a variation of aberration during focusing.

Since, in the rear focus type zoom lens, the first lens group is stationary and, therefore, there is no need of making its diameter large to increase the amount of light incident on a peripheral portion of the image plane when it is to be moved forward, the diameter of the first lens group can be made smaller correspondingly and thus it is possible to make the whole zoom lens compact. However, in the rear focus type zoom lens in which other lens groups than the stationary first lens group which is used to compensate for aberrations of the whole zoom lens system and closer to the image plane is moved along the optical axis, a balance of aberration for the whole zoom lens system is broken when the fifth lens group is so moved, causing a variation of aberration during focusing to be hard to maintain stably. This is also a big problem.

However, in order to minimize the variation of aberration when focusing is to be performed by moving the fifth lens group, it is necessary to make aberrations (specific aberrations) occurring in the fifth lens group itself small. However, since the thickness of the fifth lens group on the optical axis is made small to reduce the total length of the zoom lens, residual aberrations such as spherical aberration can not be corrected by only the fifth lens group. For this reason, according to the present invention, the fifth lens group is adapted to correct specific aberrations corresponding to coma and astigmatism, etc., which affect performance of the zoom lens adversely during focusing, with a balance to the aspherical surface provided in the fourth lens group, so that aberrations which can not be corrected by the fifth lens group are corrected by the whole zoom lens. Further, as mentioned above, with the system in which light incident on a center portion of the image plane becomes substantially afocal on the exit side of the fourth lens group, it is possible to restrict a variation of spherical aberration which is balanced by the fourth and fifth lens groups by maintaining the height of light entering into the fifth lens group always substantially the same, even when the fifth lens group is moved in a focusing operation.

The zoom lens in this invention eliminates such problems as above which result from the reduction of total length, by providing the lens system constituted as mentioned hereinbefore and satisfying the conditions (i) to (iv).

BRIEF DESCRIPTION OF THE DRAWINGS

FIGS. 8 to 16 are characteristics curves showing aberrations in the first numerical embodiment of the present invention when applied to a front focus type zoom lens;

DETAILED DESCRIPTION OF THE PREFERRED EMBODIMENTS

An embodiment of the present invention will be described with reference to the drawings.

Figure 1:
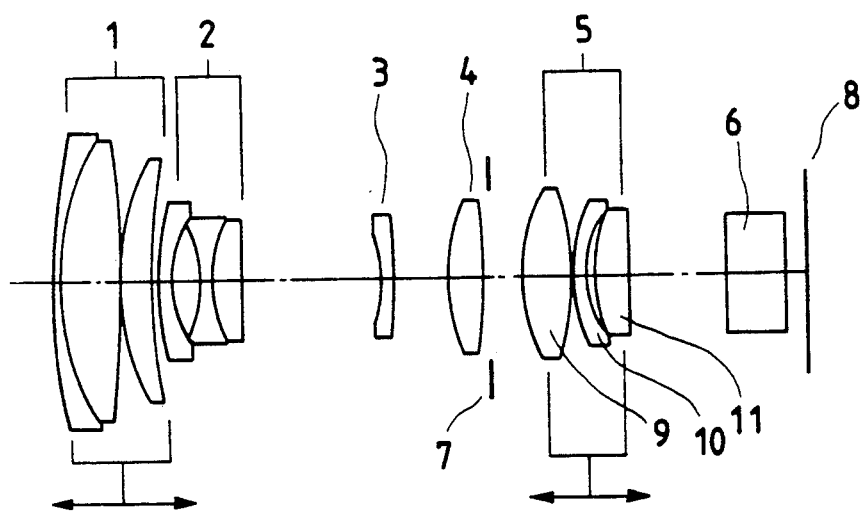
FIG. 1 is a cross section showing a zoom lens construction of a first embodiment of the present invention.

FIG. 1 is a cross sectional view showing a construction of a zoom lens according to an embodiment of the present invention. The zoom lens shown in this figure includes, from an objective side, a first lens group 1 having a positive power, a second lens group 2 and a third lens group 3 which have negative powers and serve to zoom by relatively moving along an optical axis during zooming, while maintaining an image plane 8 always stationary, a fourth lens group 4 having a positive power, being stationary in both zooming and focusing and having at least one surface which is aspherical, an iris 7 disposed on the object side of the fourth lens group 4 or on the exit side of the fourth lens group 4 as shown, a fifth lens group 5 having a positive power, a quartz plate 6 serving as not a lens but a low frequency optical filter, and a focal plane 8.

Figure 2:
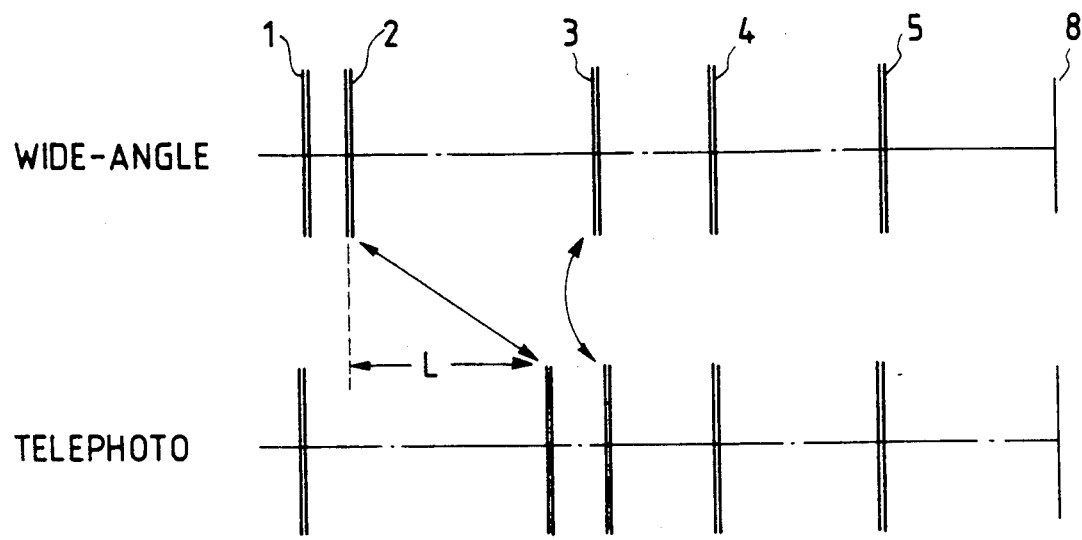
FIG. 2 shows an arrangement of lens groups in the present zoom lens.

FIG. 2 shows relative positions of the second lens group and the third lens group to the remaining lens groups of the zoom lens shown in FIG. 1 at wide-angle end and telephoto end in zooming, respectively. FIGS. 3 to 7 show variations of various parameters when focal lengths of the respective lens groups in FIG. 2 are changed, with zoom ratio, focal length as a whole and distances between the respective lens groups when they are closest to each other during zooming operation being assumed as constant, respectively.

Figure 3:
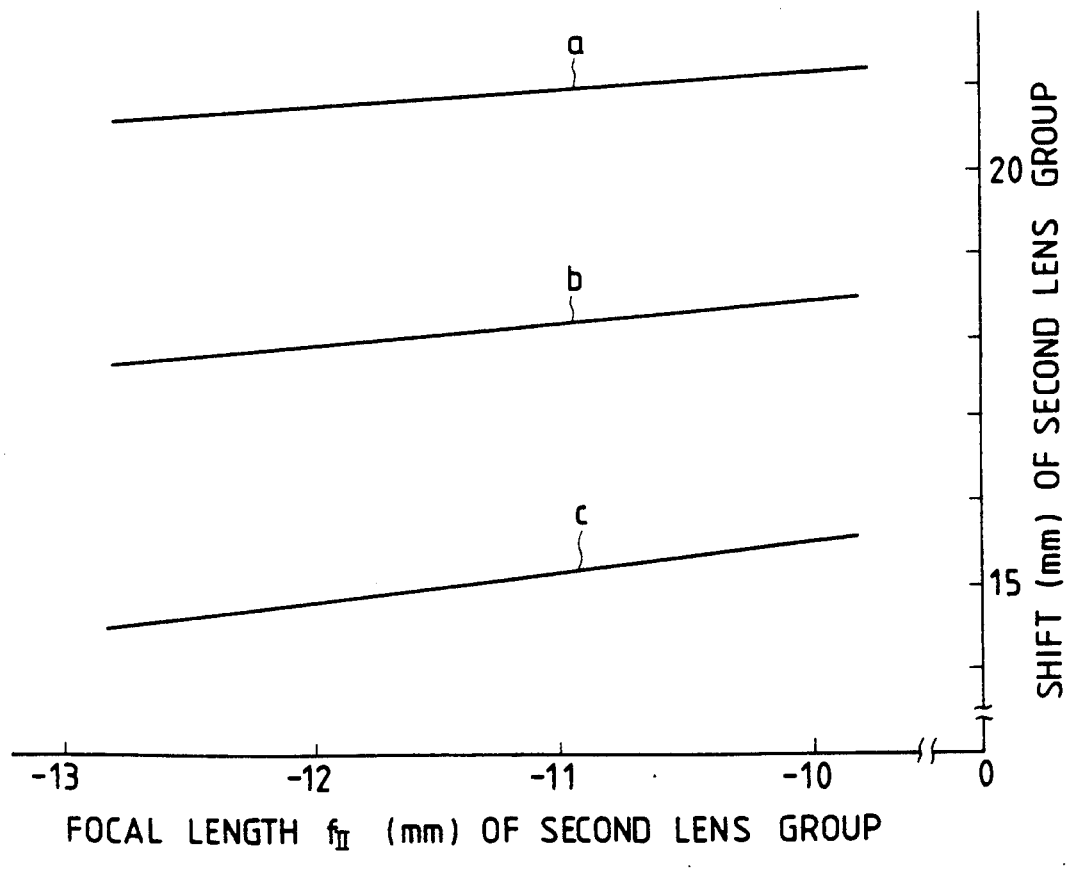
FIGS. 3 to 7 show variations of various parameters when focal lengths of the respective lens groups shown in FIG. 2 are changed.

In FIG. 3, a variation of shift amount L(mm) of the second lens group 2 is shown when the focal lengths of the first lens group 1 and the second lens group 2 are changed for zooming between wide-angle end and telephoto end (FIG. 2). In FIG. 3, abscissa shows focal length $f_{II}$ (mm) of the second lens group 2. Further, a curve a in the same figure is a case where focal length $f_I$ of the first lens group 1 is 43.7 mm, b is a case where $f_I$ is 39.4 mm and c is a case where $f_I$ is 35.0 mm, respectively.

From this figure, it is clear that the amount of shift of the second lens group 2 is remarkably reduced by reducing the focal length of the first lens group 1. Further, is clear that it is effective for reduction of the shift amount to make the focal length of the first lens group 1 with respect to that of the second lens group 2.

Figure 4:
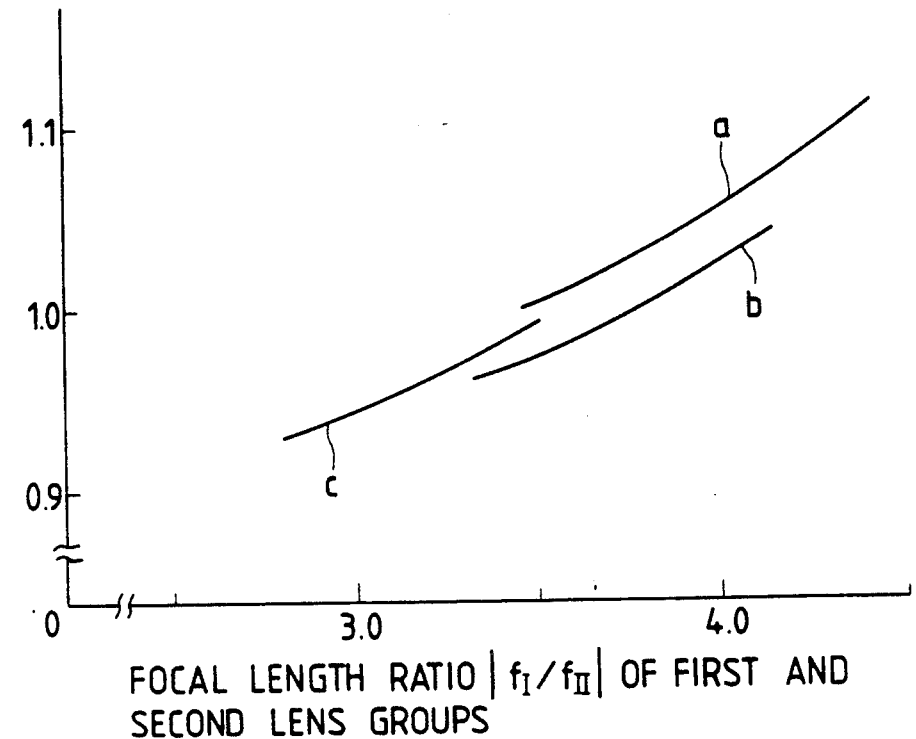

FIG. 4 shows height of light directed to a center of the image plane 8 and passing through the fourth lens group 4 when a ratio of focal distance between the first lens group 1 and the second lens group 2 is changed. Abscissa of this figure shows an absolute value $|f_I/f_{II}|$ of ratio focal distance of the first lens group 1 with respect to that of the second lens group 2 and ordinate shows height of light directed to the center of the image plane at wide-angle end and passing through the fourth lens group 4. The height of light is shown in ratio with unity when focal length $f_I$ of the first lens group 1 is 43.7 mm and focal length $f_{II}$ of the second lens group 2 is −12.5 mm. In the same figure, a curve a is a case where focal length $f_I$ of the first lens group 1 is 43.7 mm, b is a case where $f_I$ is 39.4 mm and c is a case where $f_I$ is 35.0 mm.

From this figure, it is clear that, when focal length of the first lens group 1 is fixed, height of light becomes larger with smaller focal length of the second lens group 2 and that, although height of light is smaller when focal length of the first lens group 1 is reduced, the latter becomes increased when focal length of the first lens group 1 is too small.

Figure 5:
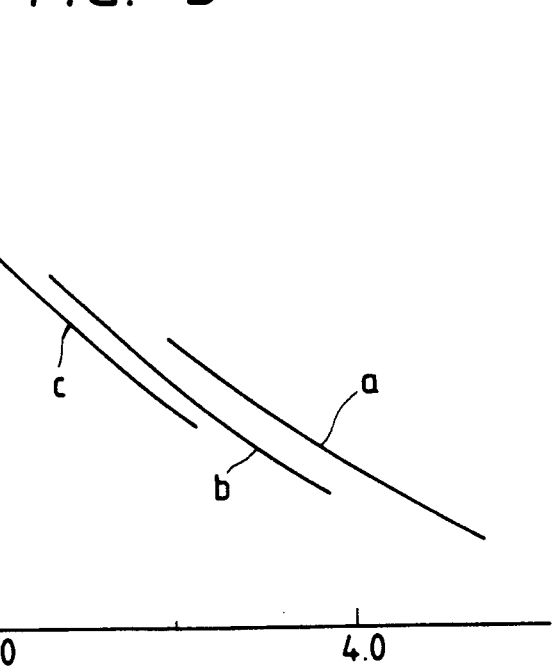

FIG. 5 also shows height of light (main light) passing through the first lens group 1, which is to be passed through a center of the iris 7 and fallen on an outermost periphery of the image plane 8, when ratio of focal length between the first lens group 1 and the second lens group 2 is changed. Abscissa in this figure shows an absolute value $|f_I/f_{II}|$ of ratio of focal length of the first lens group 1 to that of the second lens group 2 and ordinate shows height of the light passing through the first lens group 1. Height is shown in ratio with unity when focal length $f_I$ of the first lens group 1 is 43.7 mm and focal length $f_{II}$ of the second lens group 2 is −12.5 mm. In the same figure, a curve a is a case where focal length $f_I$ of the first lens group 1 is 43.7 mm, b is a case where $f_I$ is 39.4 mm and c is a case where $f_I$ is 35.0 mm.

From this figure, it is clear that, when ratio of focal length between the first lens group 1 and the second lens group 2 is fixed, height of light becomes smaller with smaller focal length of the first lens group 1. However, when focal length of the second lens group 2 is too small, that is, when ratio of focal length between the first lens group 1 and the second lens group 2 is reduced, height of light is increased.

Figure 6:
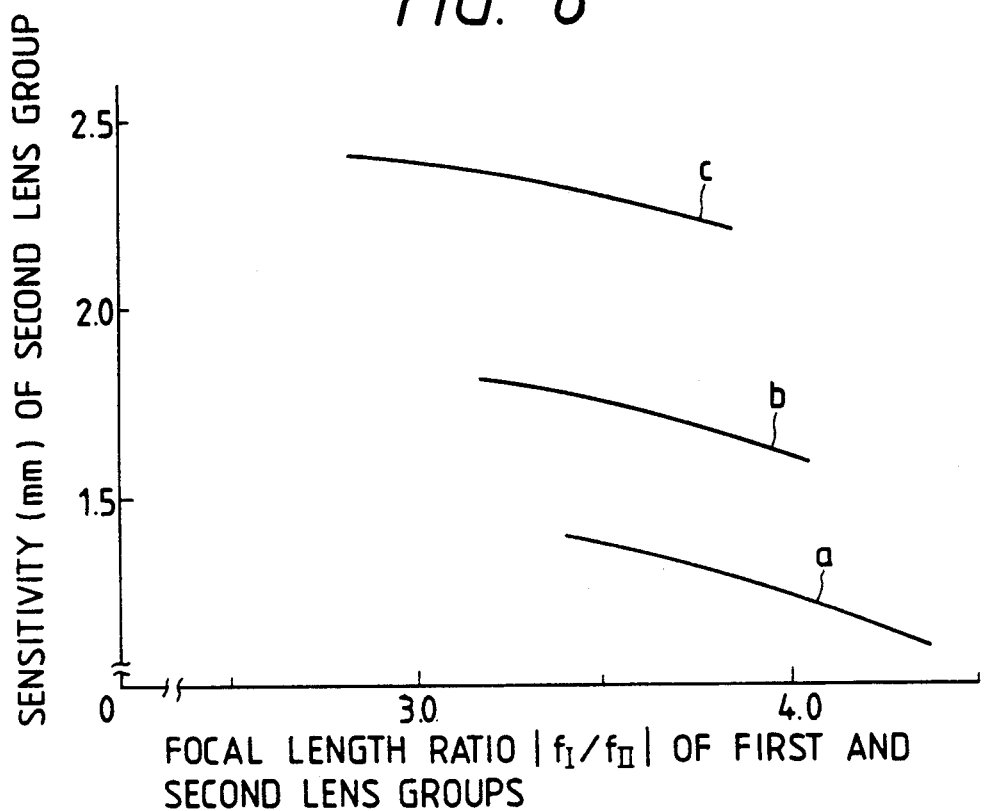
Figure 7:
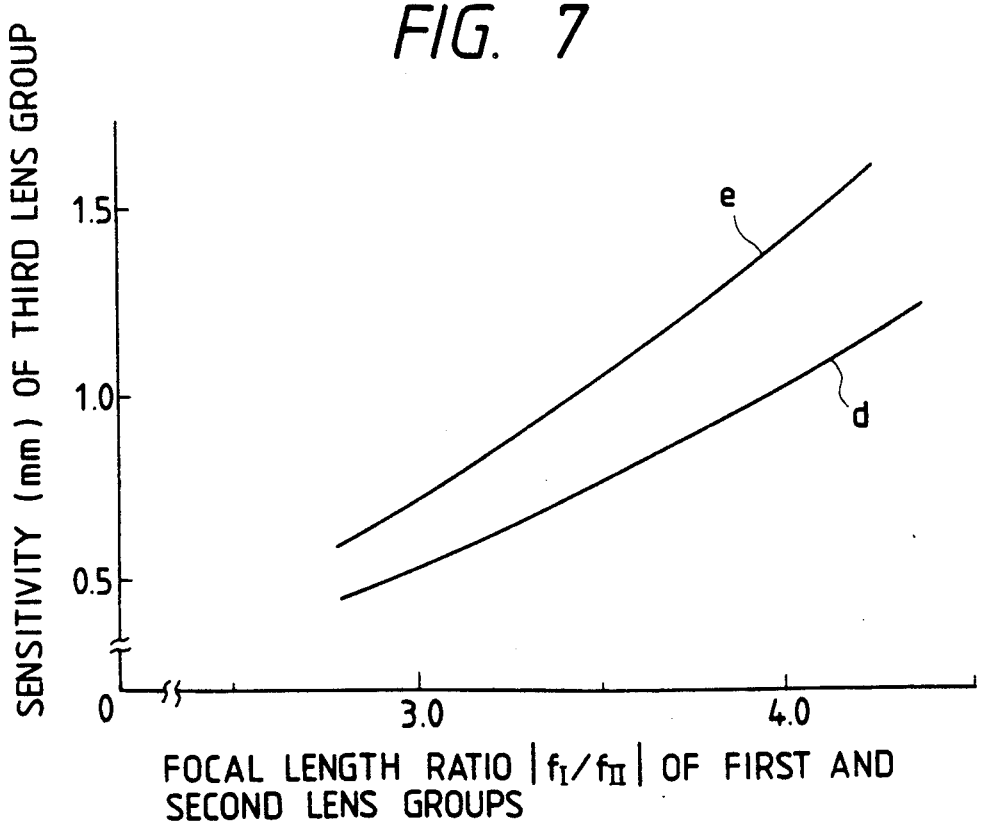

On the other hand, FIG. 6 shows a variation of positioning accuracy of the second lens group 2 on the optical axis at the telephoto end of the zoom lens when ratio of focal length between the first lens group 1 and the second lens group 2 is changed. Abscissa in this figure shows ratio in focal length of the first lens group 1 to that of the second lens group 2 and ordinate shows, as amount showing equivalently the positioning accuracy of the second lens group 2 on the optical axis, an amount of shift (referred to sensitivity hereinafter) of light on the image plane 8 when the respective lens groups are moved along the optical axis by a unit distance (1 mm). Further, FIG. 7 shows a variation of sensitivity of the third lens group 3 at telephoto end of the zoom lens when the ratio in focal length between the first lens group 1 and the second lens group 2. Abscissa in FIG. 7 shows ratio of focal length of the first lens group 1 to that of the second lens group 2 and ordinate shows the sensitivity of the third lens group 3. From FIGS. 6 and 7, it is clear that the sensitivity of the second lens group 2 is increased when the focal length of the first lens group 1 is decreased while the ratio of it to that of the second lens group 2 is kept constant and that the sensitivity of the second lens group 2 is little changed and that of the third lens group 3 is reduced considerably, when the focal length of the first lens group 1 is kept constant and the ratio in focal length of the first lens group 1 to the second lens group 2 is reduced.

Therefore, it is important to determine focal lengths of the respective lens groups so that the height of light in the first lens group 1 and the fourth lens group 4 are made low and the amounts of shift of the second lens group 2 and the third lens group 3 are minimized, while the sensitivities thereof are maintained at practically acceptable values.

Within the ranges defined by the conditions (i) to (iii), it is possible to maintain the positioning accuracy of the lens groups at practically acceptable values, to reduce the height of light passing through the first lens group 1 and the fourth lens group 4 to thereby make the zoom lens compact and reduce the total length thereof, and restrict variations of various aberrations due to zooming.

In a zoom lens according to this embodiment, a total length is reduced by selecting an interval on an optical axis between the fourth lens group 4 and the fifth lens group 5 as small as possible such that a position of an exit pupil is maintained sufficiently remote from the image plane 8 and that a moving range of the fifth lens group is given when the zoom lens is of the rear focus type.

With the first lens group 1, the second lens group 2 and the third lens group 3 all having focal lengths satisfying the conditions (i) to (iii), the total length is reduced, the lens is made compact and the aberrations are reduced, by making moving amounts of the second lens group 2 and the third lens group 3 in zooming small and by making height of light passing through the first lens group 1 and the fourth lens group 4 as small as possible.

Further, by constituting the first lens group 1 with, sequentially from the objective side, a cemented lens composed of a lens having a negative power and a lens having a positive power and a meniscus lens having a positive power and having a surface having large radius of curvature and facing to an image plane side and constituting the second lens group 2 with, sequentially from the objective side, a lens having a negative power and a cemented lens composed of a lens having a negative power and a lens having a positive power, the various aberrations of the respective lens groups having focal lengths determined to reduce the total length according to the conditions (i) to (iii) are compensated for to acceptable extents. If such the cemented lens of the first lens group 1 is absent, which means that the focal length of the first lens group 1 is made smaller compared with the conventional system, tolerance of lenses constituting the first lens group 1 is degraded. If the cemented lens is separated, astigmatism may be increased in planes of the separated lenses thereof and/or higher order aberrations may be produced, although the freedom of aberration compensation increases. Radii of curvature of cemented planes of the cemented lenses of the first lens group 1 are set such that variations of spherical aberration and chromatic aberration of the respective lens groups at telephoto end of the zoom lens in zooming are compensated for and balanced and the lens of the first lens group 1 which is closest to the object is effective to restrict, particularly, spherical aberration and coma aberration and reduce variations thereof in zooming. If such the cemented lens of the second lens group 2 is absent, tolerance of lenses constituting the second lens group 2 becomes severe. Radii of curvature of cemented planes of the cemented lenses of the second lens group 2 are set such that, together with the cemented plane of the cemented lens of the first lens group 1, variations of chromatic aberration of the respective lens in, particularly, zooming. With this construction, aberrations of the whole zoom lens system are compensated for and balanced when the system is made comact by reducing the focal length of the first lens group 1. The lens of the second lens group 2 which is closest to the object has a configuration determined such that variation of distortion of image due to zooming is compensated for.

Further, the zoom lens according to the present invention preferably satisfies the following condition:

$$200 < |\nu_{II}| \tag{v}$$

where $\nu_{II}$ is defined by the following equation:

$$1/\nu_{II} = f_{II}\{1/(f_{II\text{-}1} \cdot \nu_{II\text{-}1}) + 1/(f_{II\text{-}2} \cdot \nu_{II\text{-}2}) + 1/(f_{II\text{-}3} \cdot \nu_{II\text{-}3})\}$$

where $f_{I\text{-}1}$, $f_{II\text{-}2}$ and $f_{II\text{-}3}$ are focal lengths of the first lens, a second lens and a third lens of the second lens group 2, when looked from the object side, and $\nu_{II\text{-}1}$, $\nu_{II\text{-}2}$ and $\nu_{II\text{-}3}$ are Abbe's numbers of the first, second and third lenses of the second lens group 2, respectively.

The condition (v) is to satisfactorily compensate for chromatic aberration of the whole zoom lens system at focal lengths of the respective lens groups set according to the present invention.

The fifth lens group 5 has the triplet construction including, from the object side, the first lens 9 having a positive power, the second lens 10 having a negative power and the third lens 11 having a positive power, in that order, and compensates, together with the aspherical plane of the fourth lens group 4, for aberration of the whole zoom lens system. With the so-called triplet construction of the fifth lens group 5, curvature of image plane is minimized and the freedom of compensation for various aberrations is made larger by making height of light passing through the second lens 10 of the fifth lens group 5 smaller compared with those passing through the first lens 9 and the third lens 11 having positive powers. In general, in a lens having triplet construction, it has been known that intervals between respective lenses of the triplet lens are very important in compensation for aberrations and that, when its diameter is large, residual aberration such as spherical aberration, etc., becomes large unless a thickness of the whole triplet lens system is increased or the number of lenses is increased. That is, if such intervals are made small and thicknesses of the respective lenses are made small, compensation for aberrations becomes difficult. In the zoom lens according to the present invention, as mentioned previously, by determining focal lengths of the respective lens groups such that height of light incident on the fifth lens group 5 and fallen in the center portion of the image plane becomes as low as possible and by providing at least one aspheric surface in the fourth lens group 4, aberration compensation for the whole zoom lens system is performed in the fifth lens group 5 which has the triplet construction and thickness on the optical axis is minimized. A meniscus surface of the second lens 10 of the fifth lens group 5, which has a small radius of curvature, is faced to the image plane to balance spherical aberration, coma aberration and astigmatism aberration produced in the first lens 9 of the fifth lens group 5 by producing them in opposite direction, minimize curvature of the image plane and balance distortion at wide-angle end and telephoto end of the zoom lens by means of a configuration of the second lens 10 itself. With the fourth lens group 4 and the fifth lens group 5, variations of aberration of the whole zoom lens system and in focusing by moving the fifth lens group 5 are restricted.

The focal length of the first lens 9 of the fifth lens group 5 is set to a small value to some extent so that a difference in height between lights passing through the first and second lenses 9 and 10 can be made relatively large so as to be effective in aberration compensation even if an interval between these lenses is small and the principal point on the side of the object in the fifth lens group 5 is made closer to the iris side so as to reduce the total length.

In the case of the rear focus type zoom lens system in which the focusing is performed by moving not the first lens group 1 but the fifth lens group 5 along the optical axis, the first lens group 1 is always fixed and never moved forwardly. Therefore, it is possible to make a diameter of the first lens group 1 small and to reduce the length thereof on the optical axis if peripheral marginal portions thereof necessary in manufacturing the same is fixed. Further, since the first lens group 1 is stationary in zooming and focusing, there is no need of incorporating a mechanism for moving the first lens group 1 to a lens cylinder structure, causing the whole lens to be compact. Further, since it is possible to set the position of the first lens group 1 on the optical axis precisely owing to the absence of the moving mechanism therefor, there is no practical problem even if the focal length of the first lens group 1 is made smaller to further reduce the total length of the zoom lens.

Further, in this embodiment, the variation of view angle in focusing is minimized and the height of light passing through the fifth lens group 5 is made as small as possible by making, on the exit pupil side of the fourth lens group 4, light incident on a center portion of the image plane substantially afocal or somewhat converging.

NUMERICAL EXAMPLES 1

A numerical example of the lens system shown in FIG. 1, which is the front focus type and in which the first lens group is adapted to perform the focusing function, is set forth below. This example is obtained for a zoom lens system having f=9.0–49.6 and F=1.4.

| | | | |
|---|---|---|---|
| $r_1 = 53.60$, | $d_1 = 0.90$, | $n_1 = 1.8467$, | $\nu_1 = 23.9$ |
| $r_2 = 28.92$, | $d_2 = 6.50$, | $n_2 = 1.5891$, | $\nu_2 = 61.3$ |
| $r_3 = -97.39$, | $d_3 = 0.20$ | | |
| $r_4 = 24.91$, | $d_4 = 3.20$, | $n_3 = 1.5891$, | $\nu_3 = 61.3$ |
| $r_5 = 54.74$, | $d_5 = $ variable | | |
| $r_6 = 23.40$, | $d_6 = 0.85$, | $n_4 = 1.7432$, | $\nu_4 = 49.3$ |
| $r_7 = 9.910$, | $d_7 = 3.41$ | | |
| $r_8 = -15.28$, | $d_8 = 0.85$, | $n_5 = 1.7432$, | $\nu_5 = 49.3$ |
| $r_9 = 10.79$, | $d_9 = 2.72$, | $n_6 = 1.8467$, | $\nu_6 = 23.9$ |
| $r_{10} = 353.0$, | $d_{10} = $ variable | | |
| $r_{11} = -16.06$, | $d_{11} = 0.85$, | $n_7 = 1.7234$, | $\nu_7 = 38.0$ |
| $r_{12} = 71.54$, | $d_{12} = $ variable | | |
| $r^*_{13} = 15.43$, | $d_{13} = 3.70$, | $n_8 = 1.5891$, | $\nu_8 = 61.3$ |
| $r_{14} = -78.11$, | $d_{14} = 0.84$ | | |
| $r_{15} = \infty$ (iris), | $d_{15} = 3.20$ | | |
| $r_{16} = 16.31$, | $d_{16} = 4.00$, | $n_9 = 1.7130$, | $\nu_9 = 53.9$ |
| $r_{17} = -71.84$, | $d_{17} = 0.30$ | | |
| $r_{18} = 35.60$ | $d_{18} = 0.85$, | $n_{10} = 1.8052$, | $\nu_{10} = 25.4$ |
| $r_{19} = 9.289$, | $d_{19} = 1.30$ | | |
| $r_{20} = 12.53$, | $d_{20} = 3.40$, | $n_{11} = 1.5891$, | $\nu_{11} = 61.3$ |
| $r^*_{21} = -55.83$, | $d_{21} = 11.0$ | | |
| $r_{22} = \infty$, | $d_{22} = 5.78$, | $n_{12} = 1.5231$, | $\nu_{12} = 58.5$ |
| $r_{23} = \infty$ | | | |

In the above example, $r_i$ is a radius of curvature of i-th lens surface from the objective side and positive when a center of curvature of the i-th lens surface is on the side of image plane and negative when it is on the side of the objective. $d_i$ is a distance on the optical axis between the i-th lens surface and a (i+1)-th lens surface adjacent thereto. n and $\nu$ are refraction index and Abbe's number of a j-th lens from the objective side, respectively.

$r_1$–$r_5$ relate to the first lens group 1, $r_6$–$r_{10}$ to the second lens group 2, $r_{11}$ and $r_{12}$ to the third lens group 3, $r_{13}$ and $r_{14}$ to the fourth lens group 4, $r_{16}$–$r_{21}$ to the fifth lens group 5 and $r_{22}$ and $r_{23}$ to the quartz plate 6, respectively.

Lens surface having radius of curvature r with an asterisk (*) is aspherical and has a shape defined by the following equation including aspheric surface coefficients.

$$Z = CY^2/\{1 + \sqrt{1 - (K + 1)C^2 Y^2}\} + A_4 Y^4 + A_6 Y^6 + A_8 Y^8 + A_{10} Y^{10}$$

where Z is a distance of a point, which is set on a nonspherical plane at a distance Y from the optical axis, from an osculating plane at an apex of an aspherical plane, C is curvature (1/r) of a reference spherical plane, K is circular cone constant, Y is height from an optical axis and $A_4$ to $A_{10}$ are fourth to tenth order aspherical plane coefficients, respectively.

In this example, $d_5$, $d_{10}$ and $d_{12}$ depend upon the focal length f. Examples thereof are shown in the Table 1.

TABLE 1

| f (mm) | d5 (mm) | $d_{10}$ (mm) | $d_{12}$ (mm) |
|---|---|---|---|
| 9.0 | 0.54 | 16.20 | 4.98 |
| 32.6 | 15.42 | 1.92 | 4.38 |
| 49.6 | 18.24 | 2.52 | 0.95 |

Figure 8:
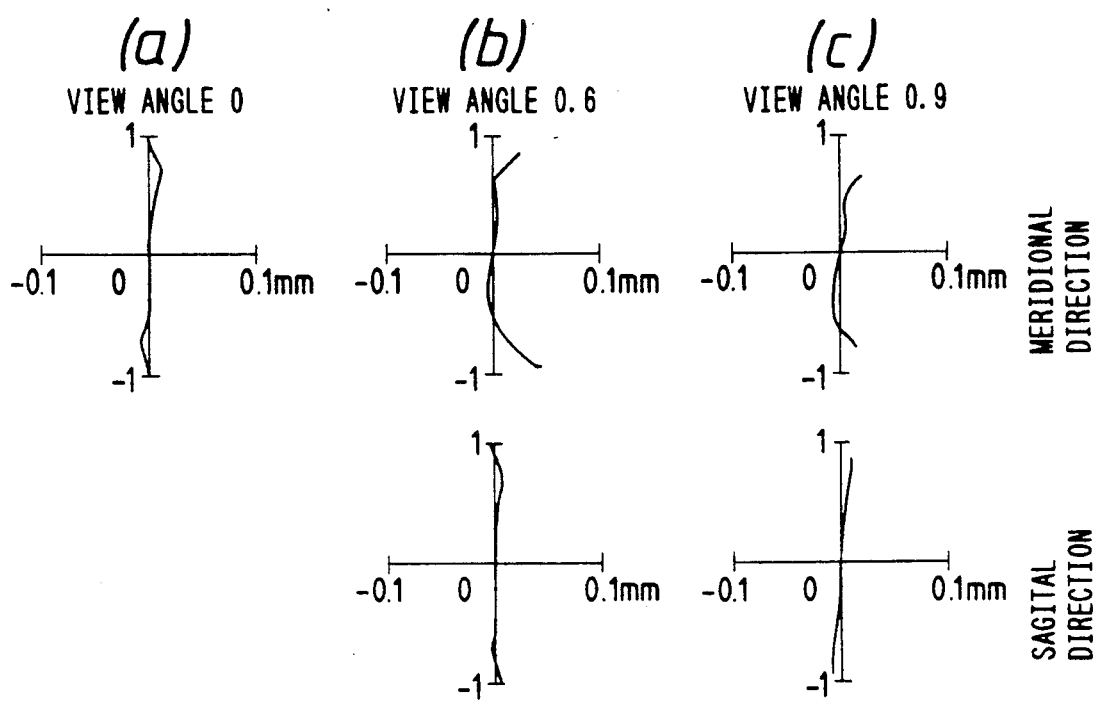
Figure 9:
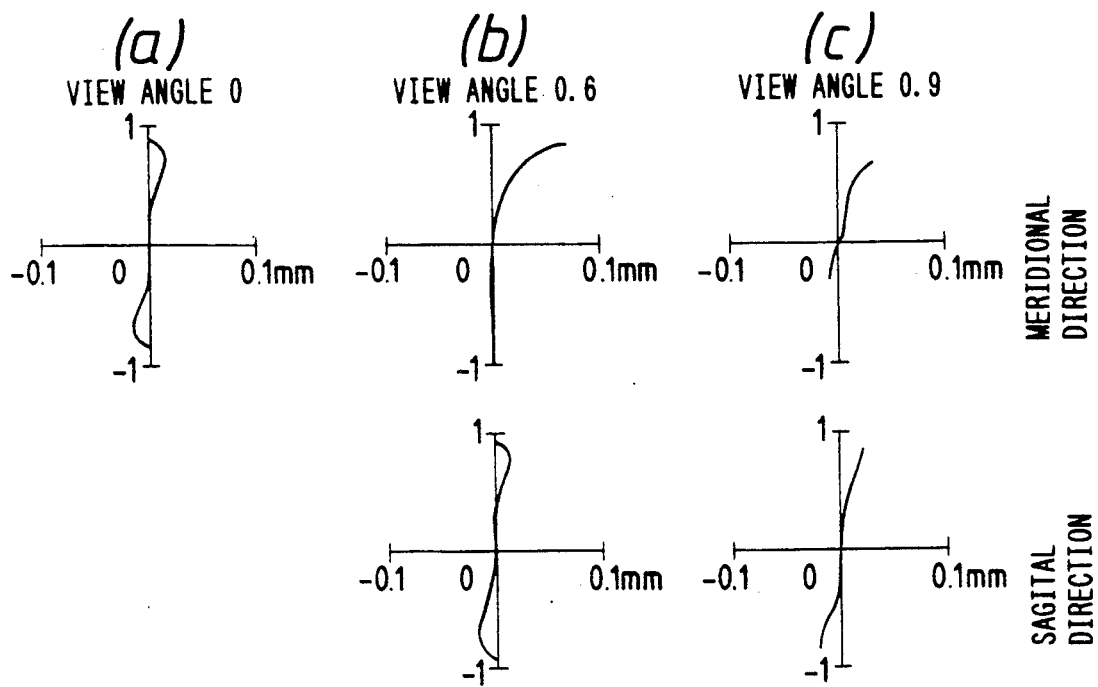
Figure 10:
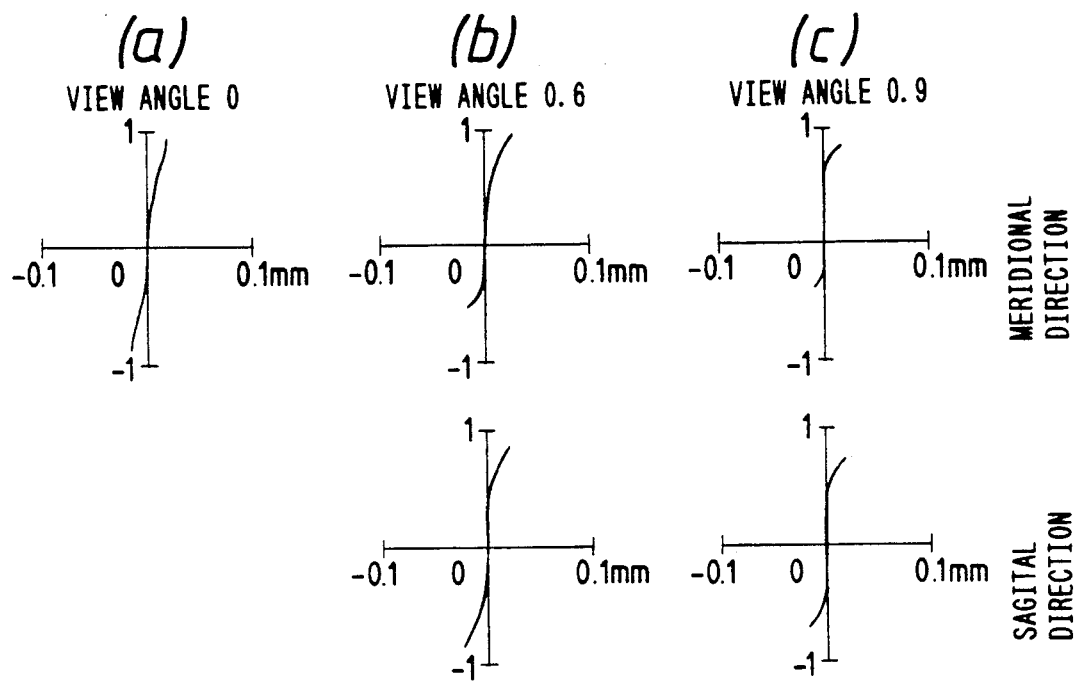
Figure 11:
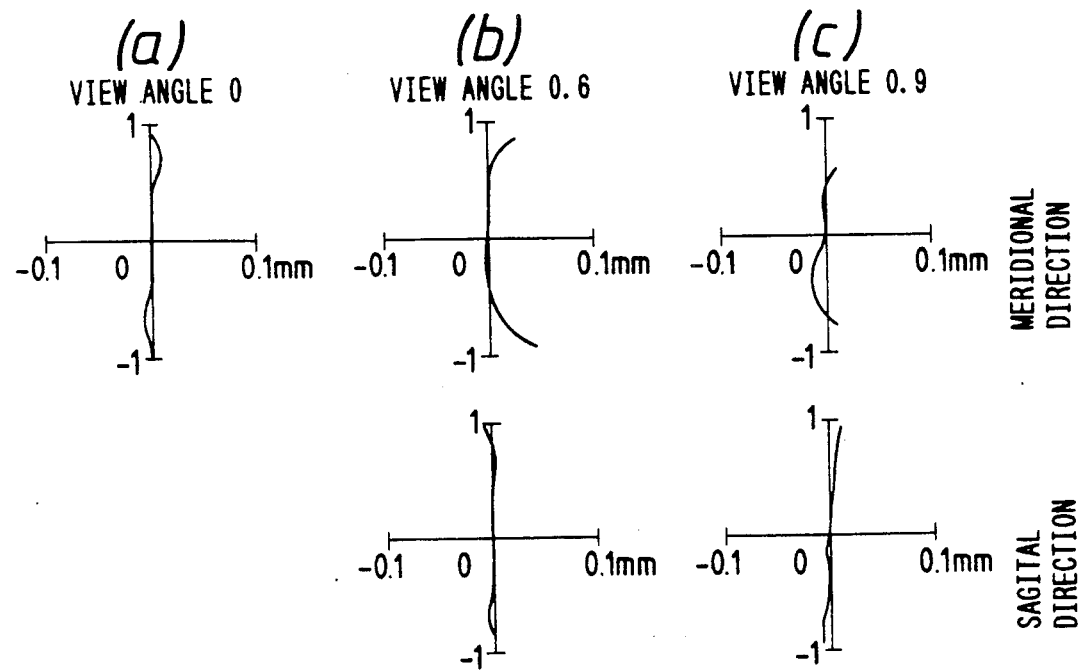
Figure 14:
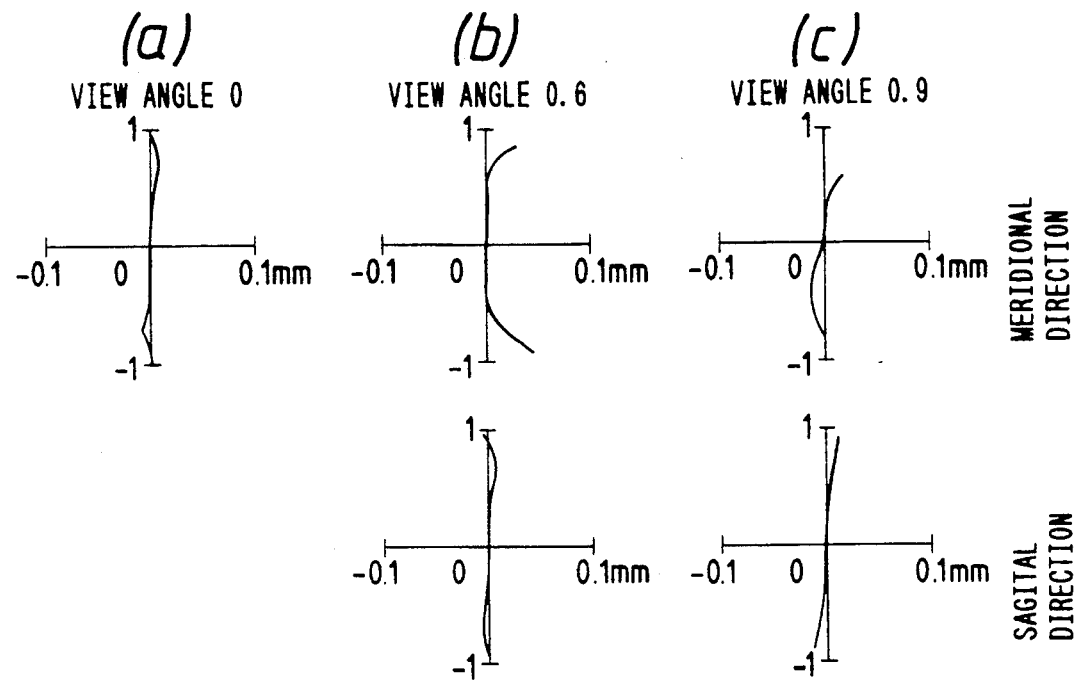
Figure 15:
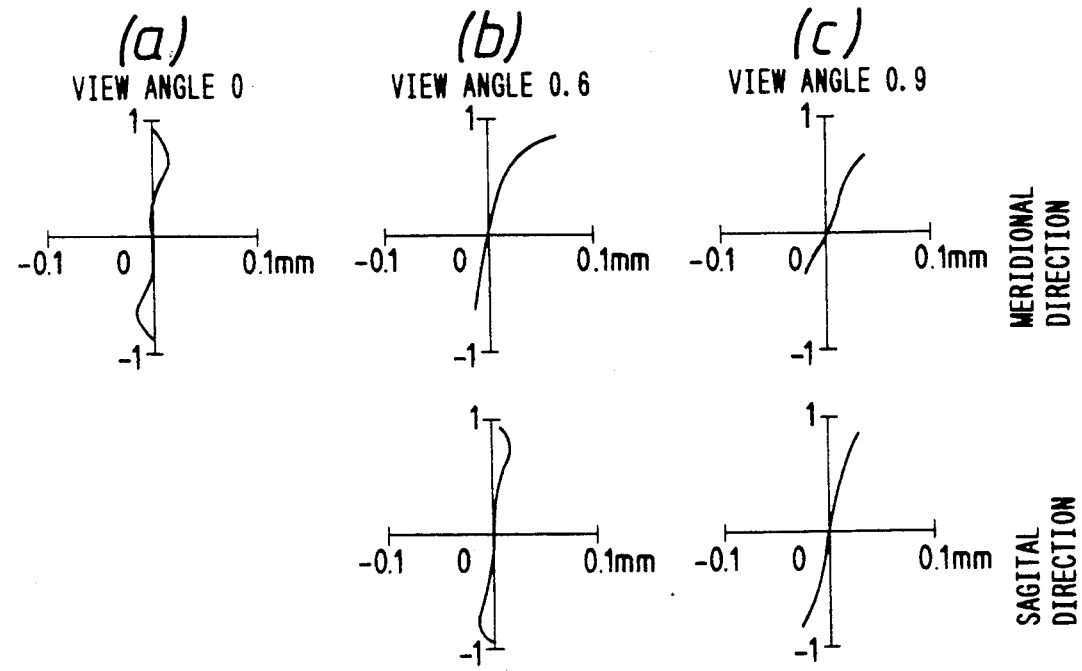
Figure 16:
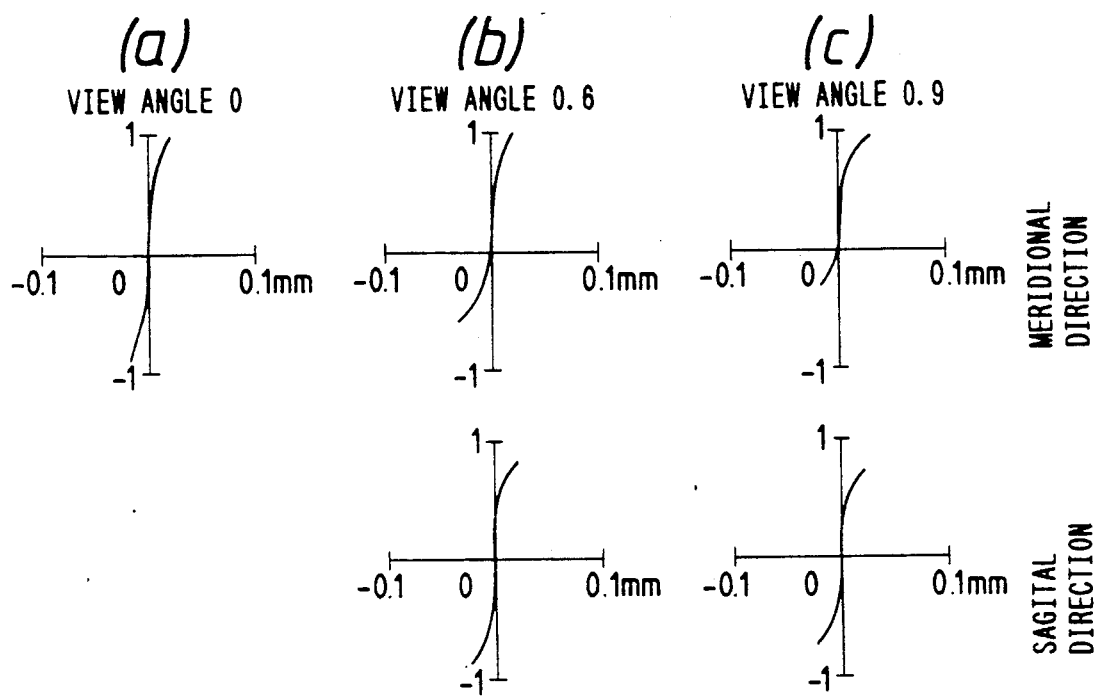

Aspherical plane coefficients in the above embodiment are as follows:

13th surface: $K = -1.2439$,
$A_4 = -6.6990 \times 10^{-5}$, $A_6 = 1.5041 \times 10^{-8}$
$A_8 = 1.9326 \times 10^{-9}$, $A_{10} = -1.8537 \times 10^{-11}$ 21st surface: $K = -79.747$
$A_4 = 2.9723 \times 10^{-5}$, $A_6 = -6.0889 \times 10^{-8}$
$A_8 = -1.7263 \times 10^{-9}$, $A_{10} = 1.1177 \times 10^{-10}$ FIGS. 8 to 10 show aberration characteristics of the embodiment 1 mentioned above when photographing an object at a distance ∞ with focal length of 9.0mm, 32.6mm and 49.6mm, respectively, FIGS. 11 to 13 show aberration characteristics thereof when photographing an object at a distance of 4 m with the same focal lengths, respectively and FIGS. 14 to 16 show aberration characteristics when photographing an object at a distance 2 m with the same focal lengths, respectively.

(a) in the characteristics corresponds to a center of light focusing plane, (b) height of light on the focusing plane corresponding to 0.6 times of the maximum view angle at respective focal length and (c) height of light on the focusing plane corresponding to 0.9 times of the maximum view angle, respectively.

In the numerical embodiment 1, values thereof corresponding to the conditions (i), (ii) and (iii) are as follows:

$|f_I/f_{II}| = 3.42$ $|f_I/f_{III}| = 1.34$ $f_I/f_W = 4.28$

The ratio of the total length to the focal length at wide-angle end in the numerical embodiment 1 is 8.34.

NUMERICAL EXAMPLE 2

Figure 17:
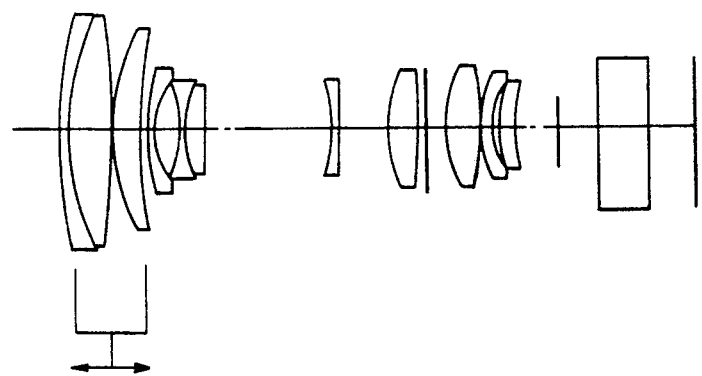
FIG. 17 is a cross section showing a zoom lens construction of a second embodiment of the front focus type zoom lens according to the present invention.
Figure 18:
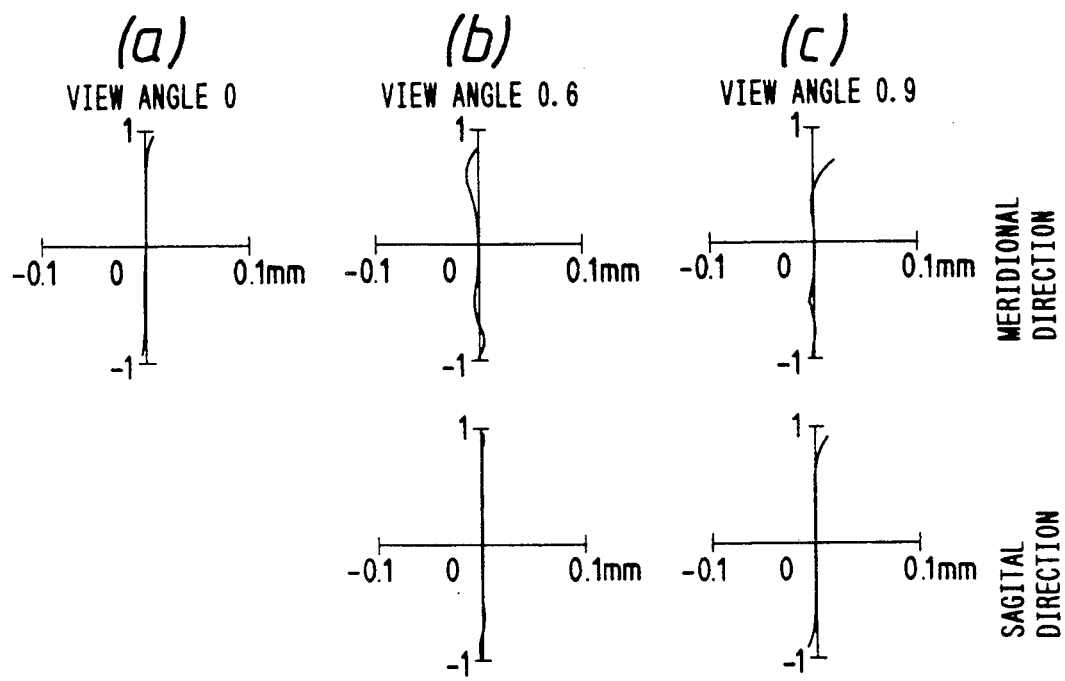
FIGS. 18 to 26 are characteristics curves showing aberrations in the second embodiment of the present invention.
Figure 19:
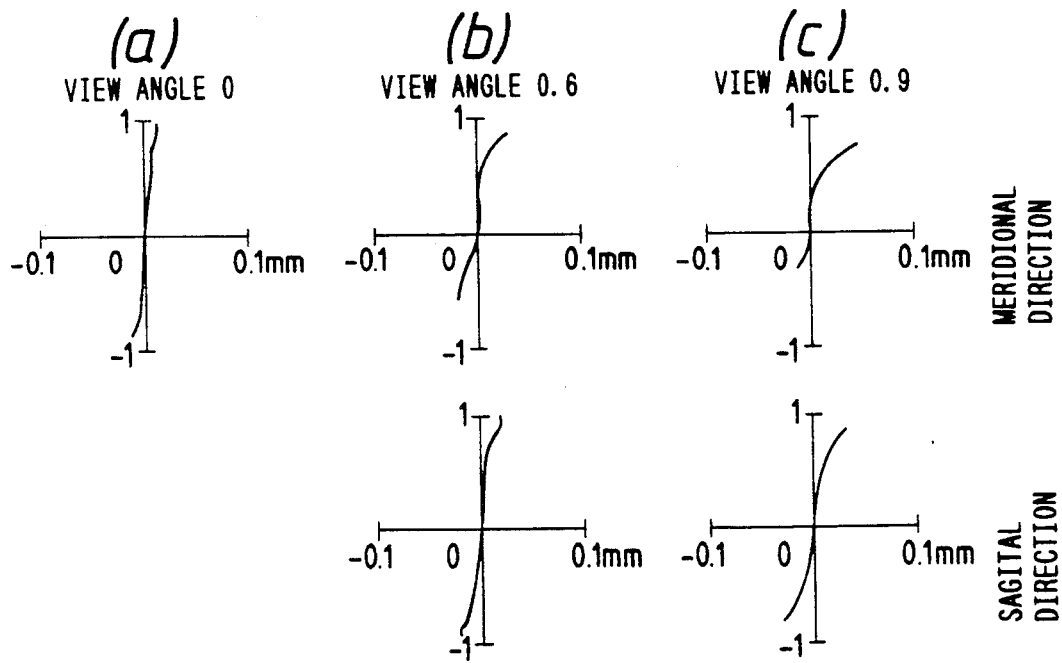
Figure 20:
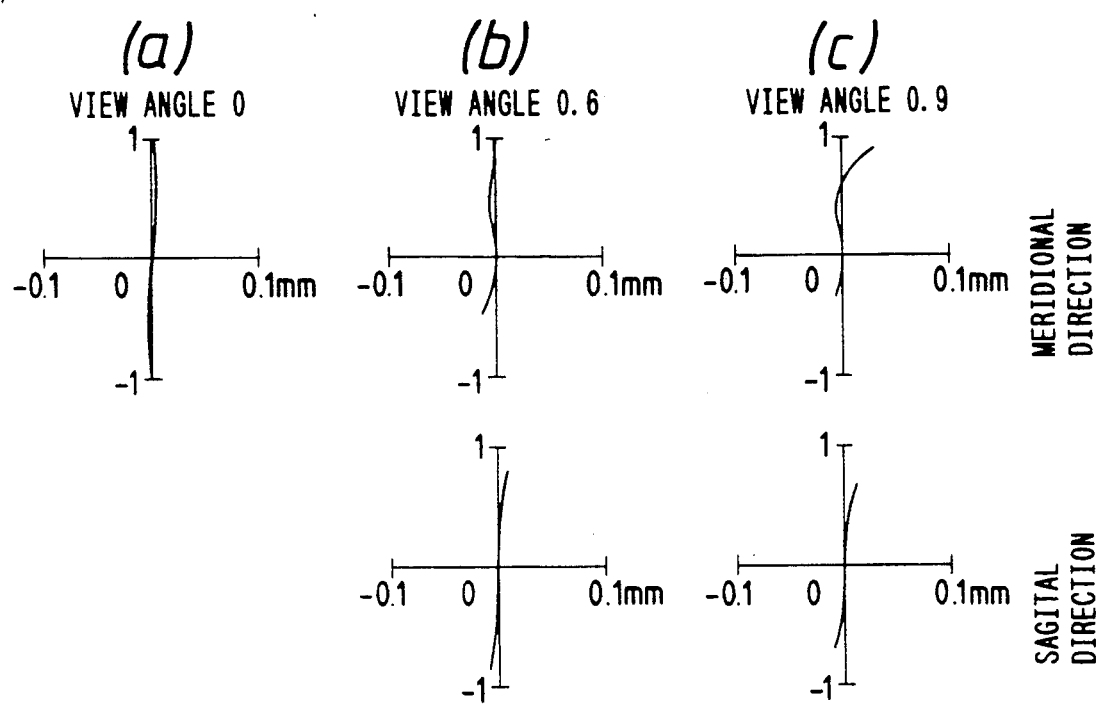
Figure 21:
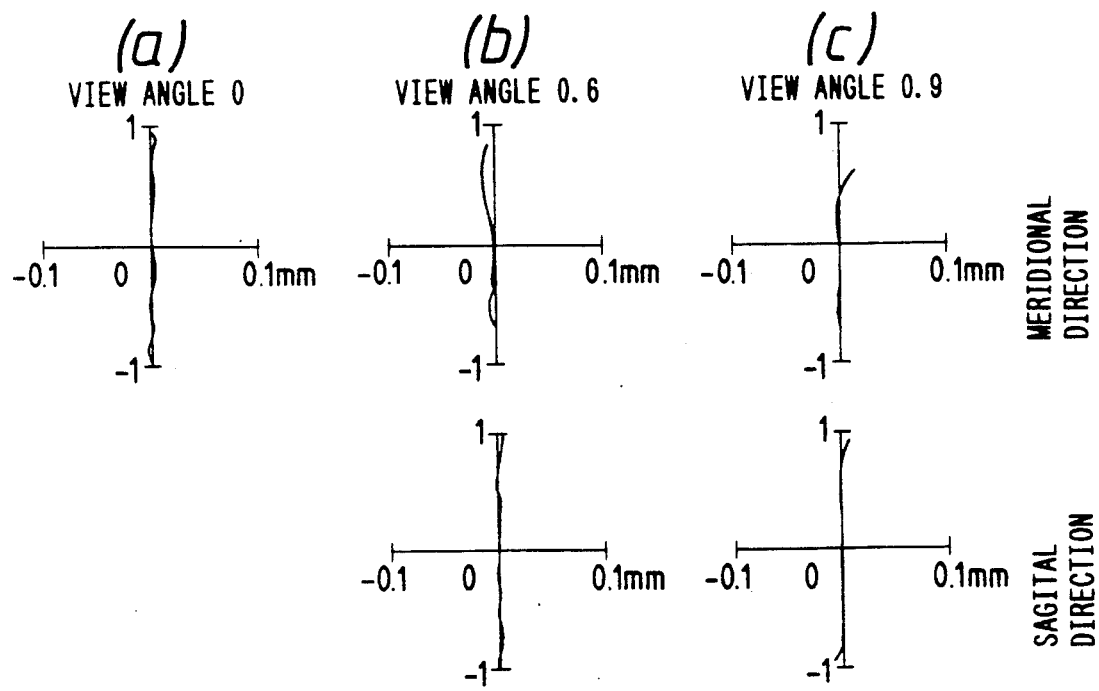
Figure 22:
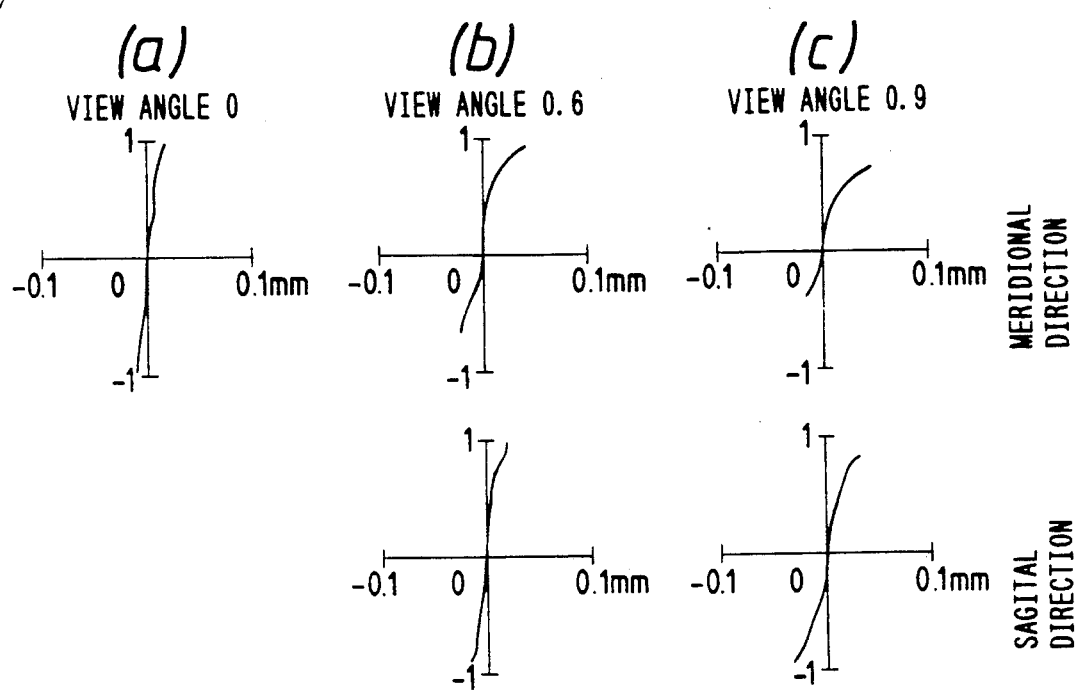
Figure 23:
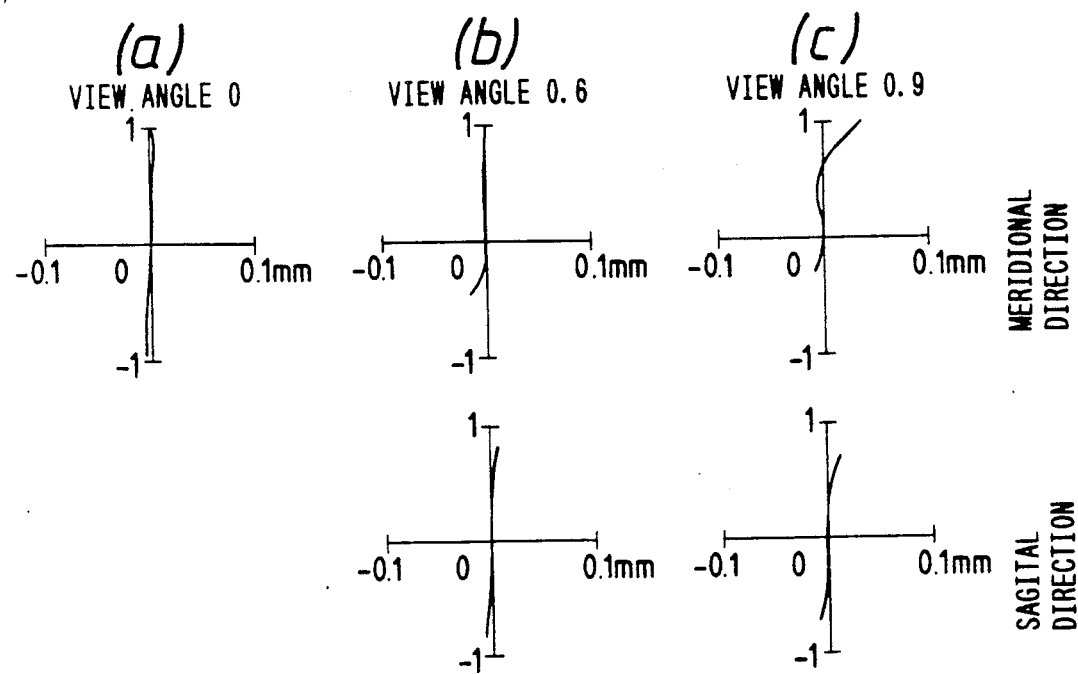
Figure 24:
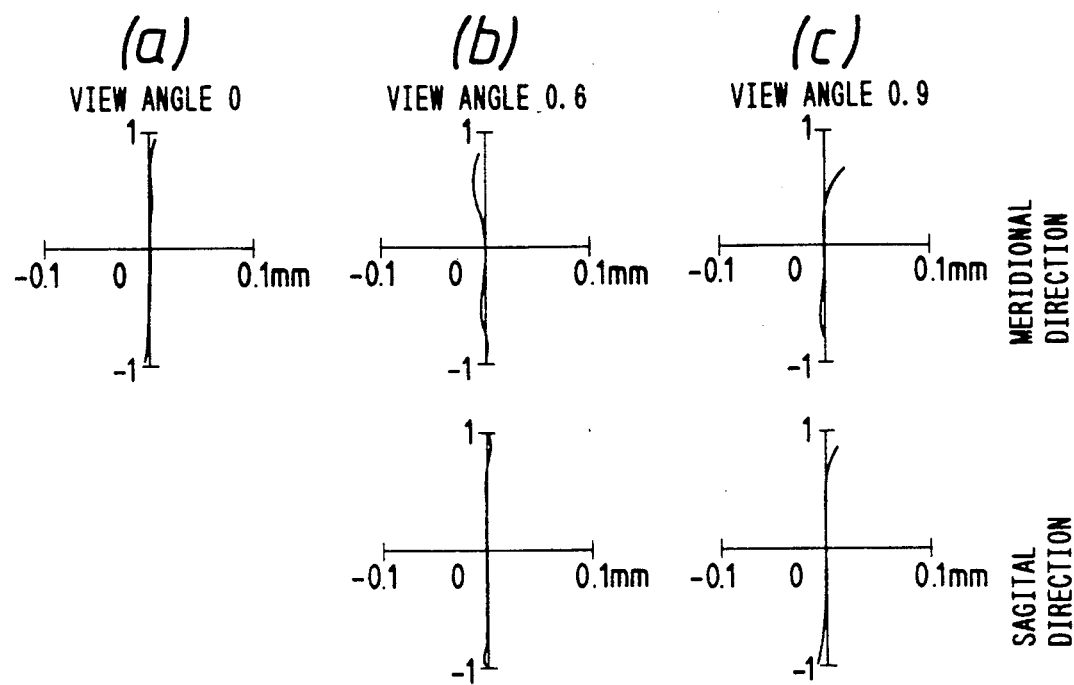
Figure 25:
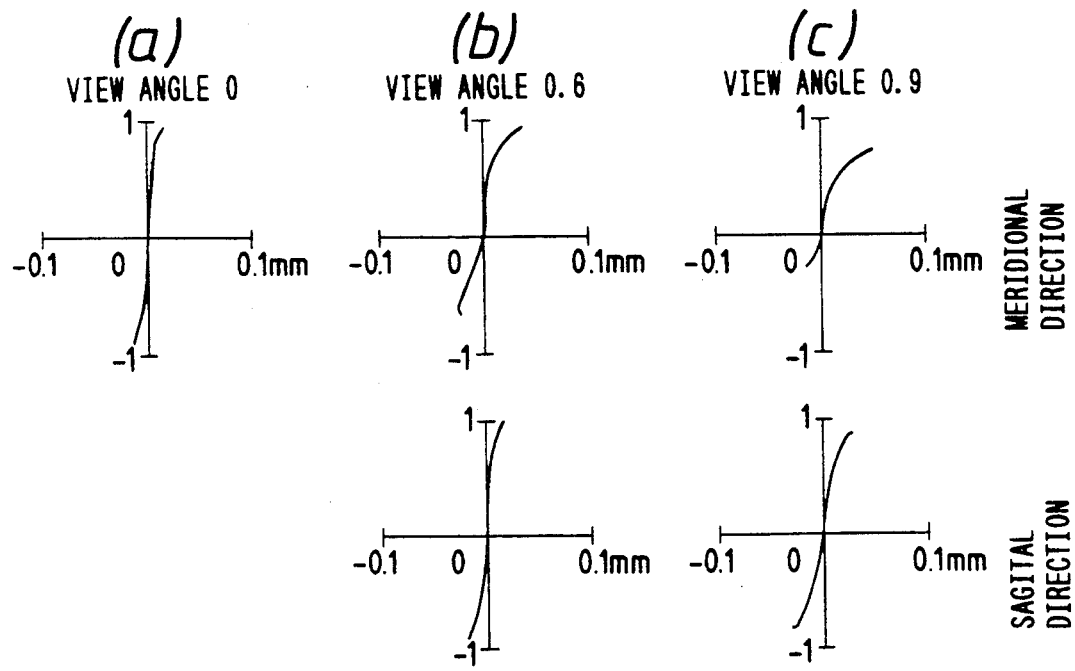
Figure 26:
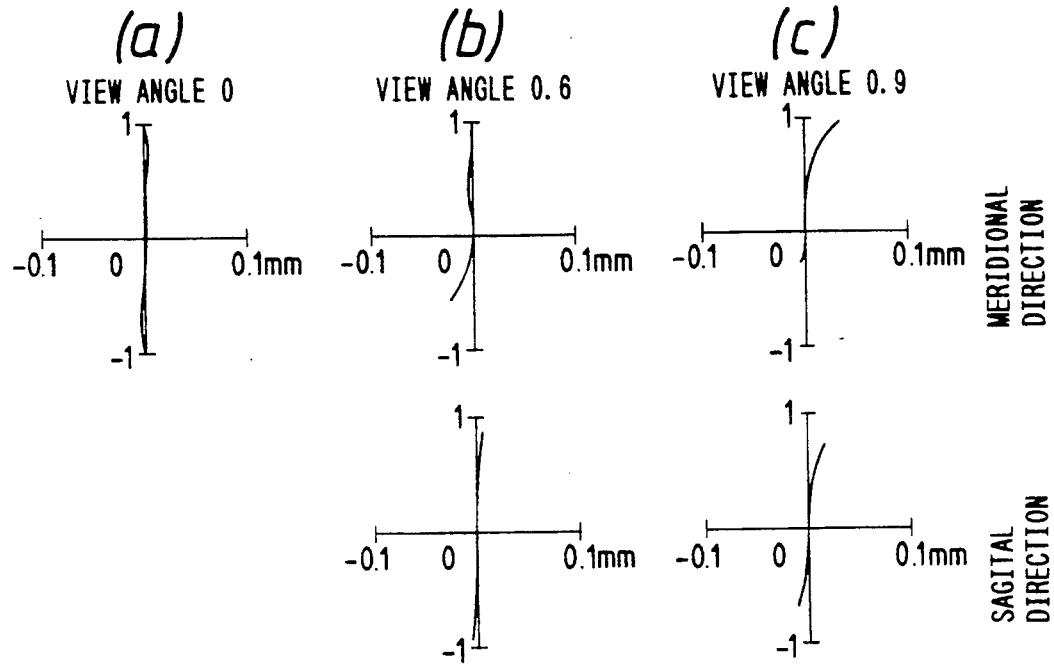

A numerical example of another embodiment of the present lens system shown in FIG. 17, which is the front focus type, is set forth below. This example is obtained for a zoom lens system having $f=9.7-53.4$ and $F=1.8$.

| | | | |
|---|---|---|---|
| $r_1 = 51.03$, | $d_1 = 0.90$, | $n_1 = 1.8467$, | $v_1 = 23.9$ |
| $r_2 = 27.47$, | $d_2 = 4.78$, | $n_2 = 1.5891$, | $v_2 = 61.3$ |
| $r_3 = -91.00$, | $d_3 = 0.20$ | | |
| $r_4 = 21.96$, | $d_4 = 2.77$, | $n_3 = 1.5891$, | $v_3 = 61.3$ |
| $r_5 = 49.92$, | $d_5 =$ variable | | |
| $r_6 = 20.98$, | $d_6 = 0.85$, | $n_4 = 1.7432$, | $v_4 = 49.3$ |
| $r_7 = 9.007$, | $d_7 = 2.78$ | | |
| $r_8 = -13.96$, | $d_8 = 0.85$, | $n_5 = 1.7432$, | $v_5 = 49.3$ |
| $r_9 = 10.34$, | $d_9 = 2.32$, | $n_6 = 1.8467$, | $v_6 = 23.9$ |
| $r_{10} = 305.8$, | $d_{10} =$ variable | | |
| $r_{11} = -16.04$, | $d_{11} = 0.85$, | $n_7 = 1.7215$, | $v_7 = 29.2$ |
| $r_{12} = -75.46$, | $d_{12} =$ variable | | |
| $r^*_{13} = 13.79$, | $d_{13} = 3.03$, | $n_8 = 1.5891$, | $v_8 = 61.3$ |
| $r_{14} = -79.06$, | $d_{14} = 0.80$ | | |
| $r_{15} = \infty$(iris), | $d_{15} = 1.80$ | | |
| $r_{16} = 13.47$, | $d_{16} = 3.68$, | $n_9 = 1.5891$, | $v_9 = 61.3$ |
| $r_{17} = -34.56$, | $d_{17} = 0.20$ | | |
| $r_{18} = 11.67$, | $d_{18} = 0.85$, | $n_{10} = 1.8467$, | $v_{10} = 23.9$ |
| $r_{19} = 6.530$, | $d_{19} = 1.00$ | | |
| $r_{20} = 11.54$, | $d_{20} = 2.50$, | $n_{11} = 1.5407$, | $v_{11} = 47.2$ |
| $r_{21} = 28.46$, | $d_{21} = 8.00$ | | |
| $r_{22} = \infty$, | $d_{22} = 5.50$, | $n_{12} = 1.5163$, | $v_{12} = 64.2$ |
| $r_{23} = \infty$ | | | |

In this example, $d_5$, $d_{10}$ and $d_{12}$ depend upon the focal length $f$. Examples thereof are shown in the Table 2.

TABLE 2

| f (mm) | $d_5$ (mm) | $d_{10}$ (mm) | $d_{12}$ (mm) |
|---|---|---|---|
| 9.7 | 0.71 | 13.99 | 5.62 |
| 34.2 | 13.90 | 1.60 | 4.82 |
| 53.4 | 16.58 | 2.74 | 1.00 |

Aspherical plane coefficients in the above embodiment are as follows:

13th surface: $K = -1.1590$,
$A_4 = -1.2760 \times 10^{-4}$, $A_6 = 6.3120 \times 10^{-7}$
$A_8 = -1.8170 \times 10^{-8}$, $A_{10} = 1.1470 \times 10^{-10}$ In the numerical embodiment 2 mentioned above, values thereof corresponding to the conditions (i), (ii) and (iii) are as follows:

$|f_I/f_{II}| = 3.36$ $|f_I/f_{III}| = 1.22$ $f_I/f_W = 3.57$

The ratio of the total length to the focal length at wide-angle end in the numerical embodiment 2 is 6.75.

The aspherical surface lens used in the embodiments may be provided by coating a glass lens with a plastic material such as PMMA (polymethylmethacrylate), with similar performance.

NUMERICAL EXAMPLE 3

Figure 27:
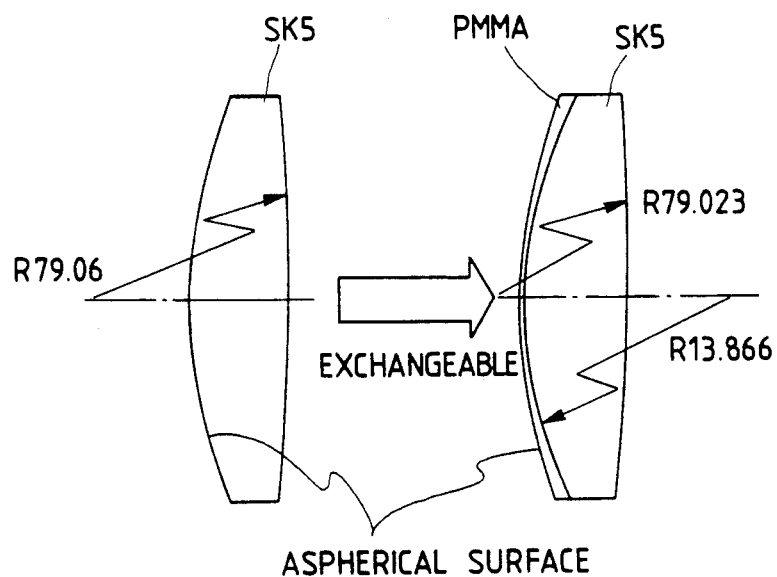
FIG. 27 shows another embodiment of an aspheric lens of the fourth lens group in the front focus type zoom lens.
Figure 28:
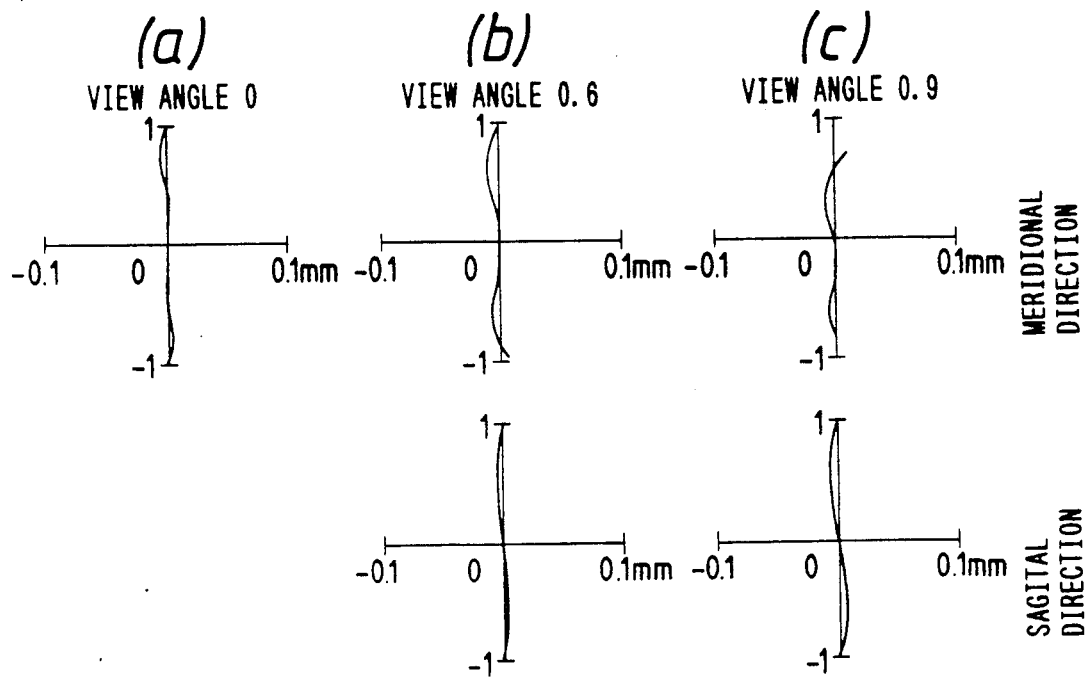
FIGS. 28 to 36 are characteristics curves showing aberrations when the present invention is applied to a rear focus type zoom lens.
Figure 29:
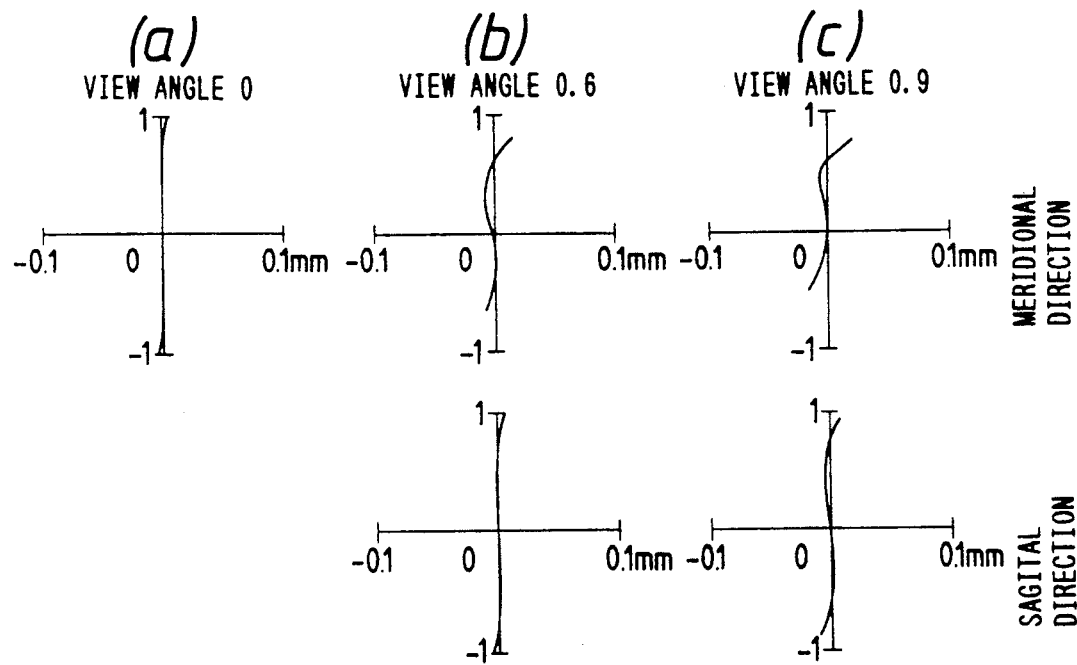
Figure 30:
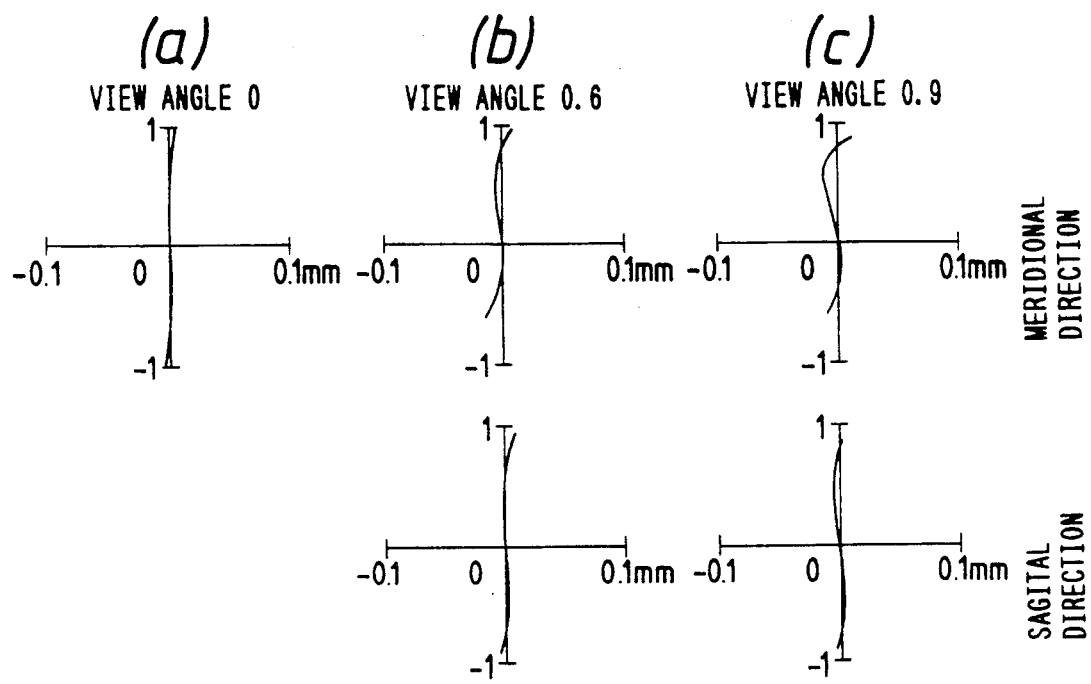
Figure 31:
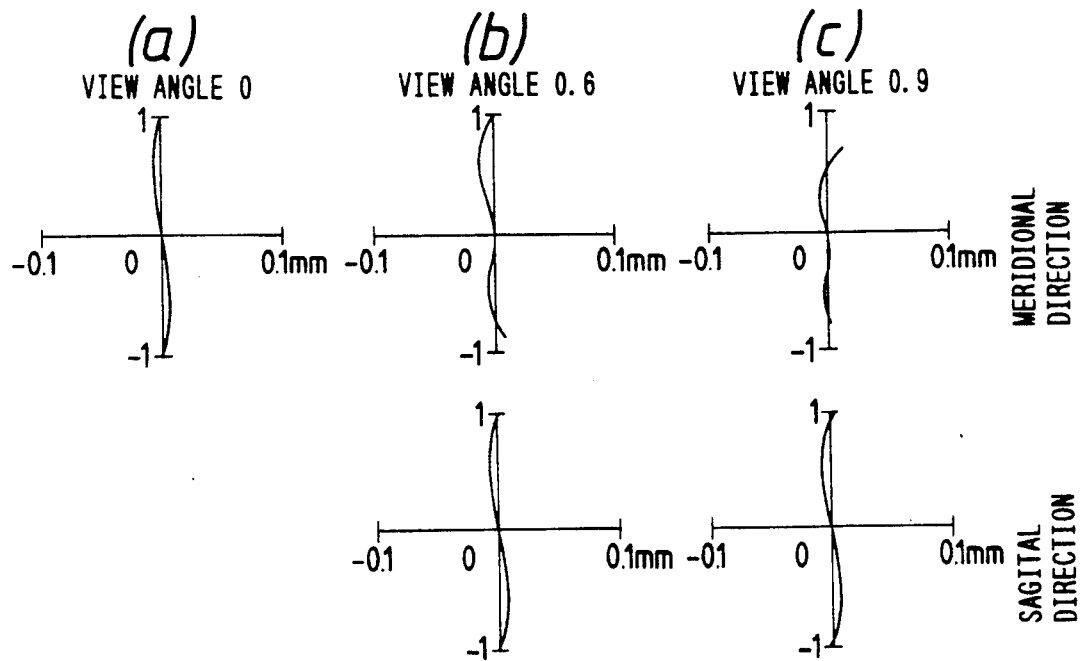
Figure 32:
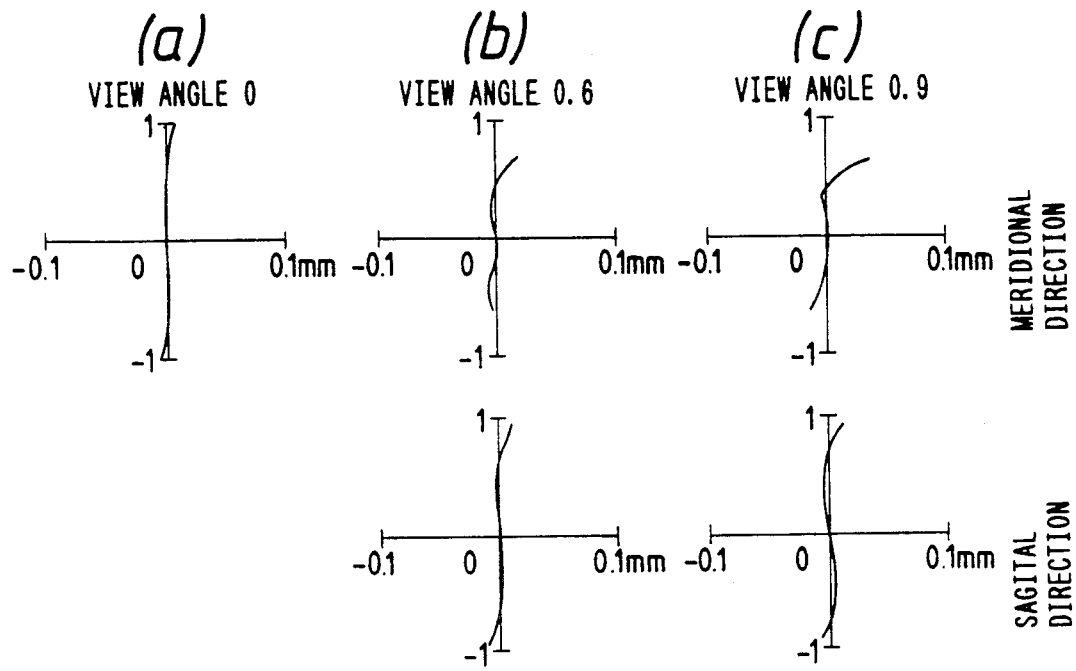
Figure 33:
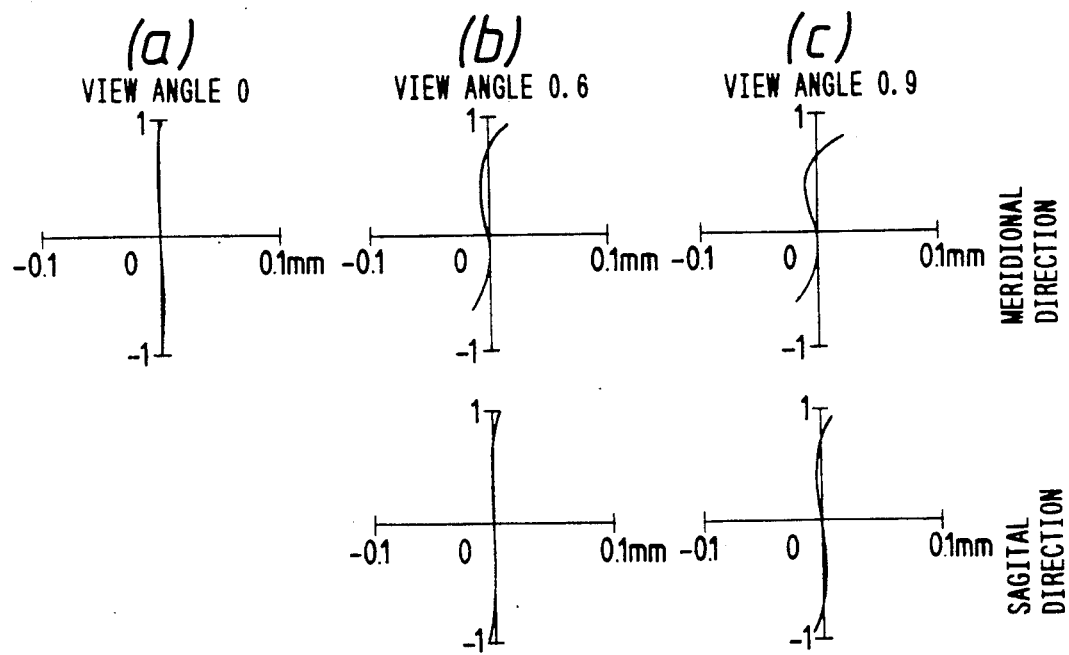
Figure 34:
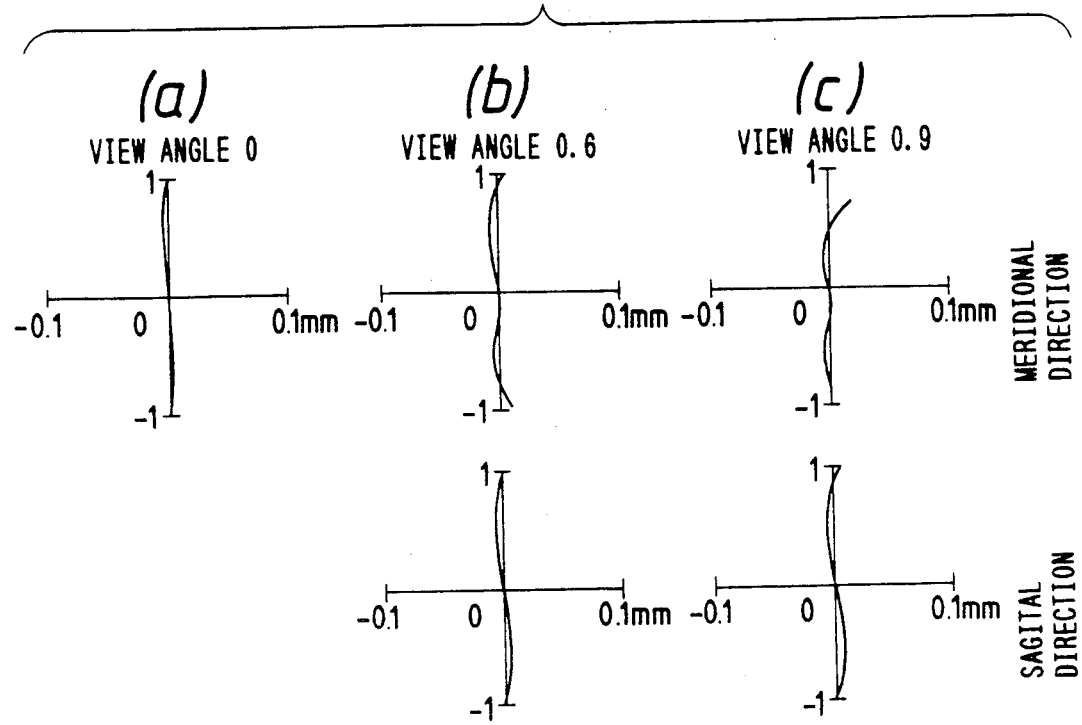
Figure 35:
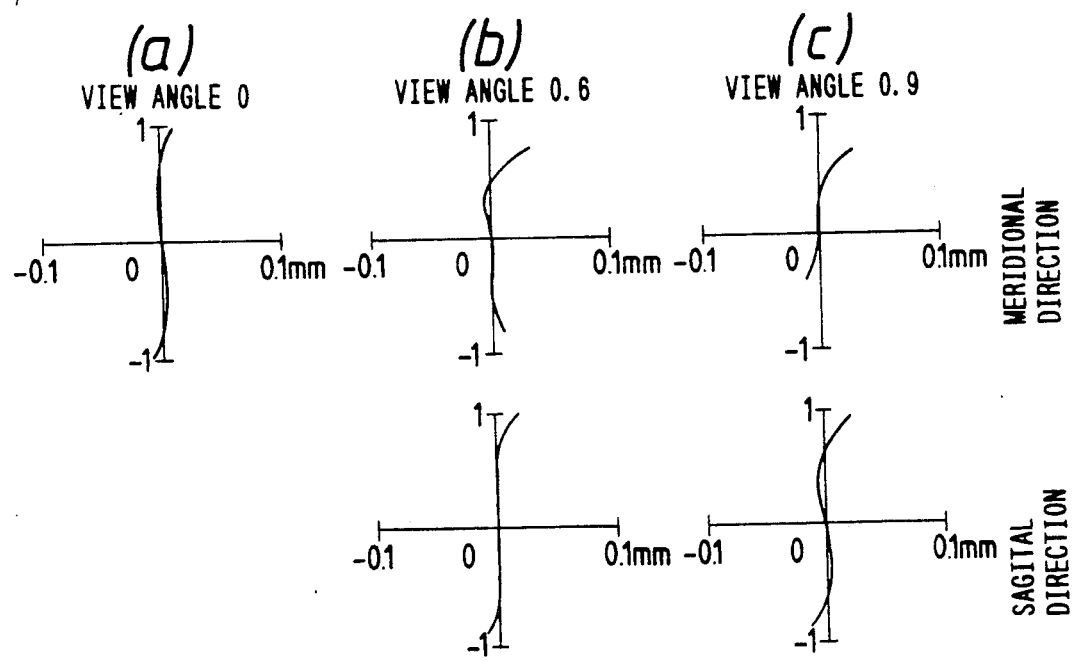
Figure 36:
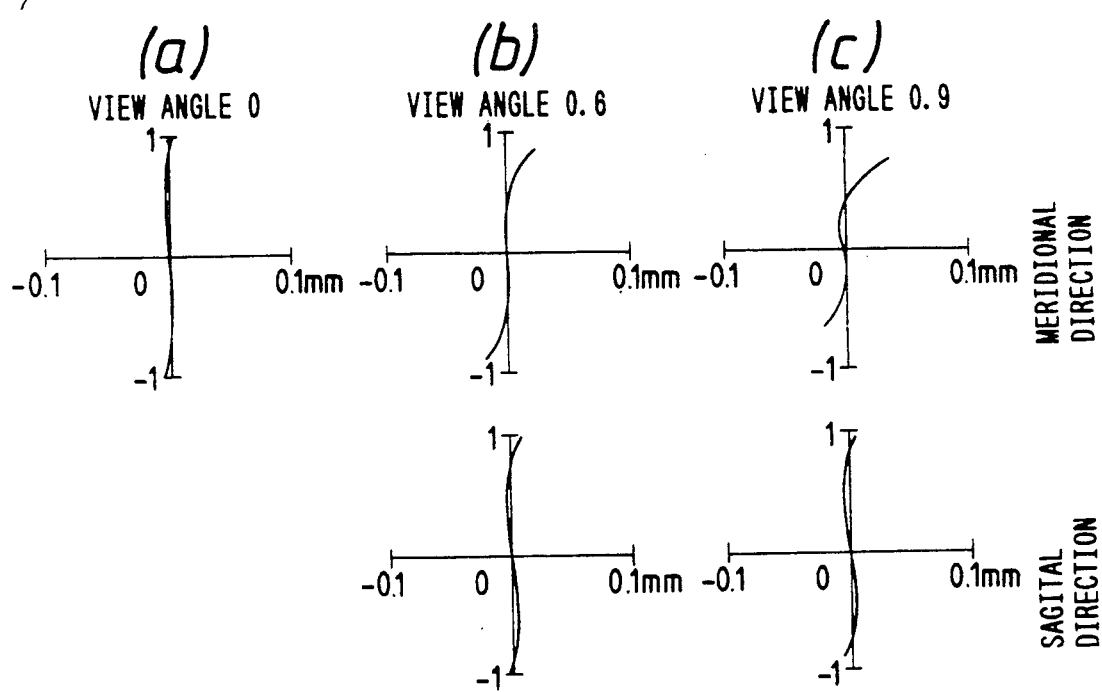

As shown in FIG. 27, the same effect as that obtained by the numerical example 2 can be achieved by substituting lenses of the fourth lens group by those having the following numerical values

| | | | |
|---|---|---|---|
| $r^*_{13} = 13.80$, | $d_{13} = 0.10$, | $n_8 = 1.4920$, | $v_8 = 57.9$ |
| $r'_{13} = 13.87$, | $d'_{13} = 3.15$, | $n'_8 = 1.5891$, | $v'_8 = 61.3$ |
| $r_{14} = -79.02$, | $d_{14} = 0.80$ | | | and making aspheric plane coefficients of the 13th surface as below:

$K = -1.1678$
$A_4 = -1.6212 \times 10^{-4}$, $A_6 = 7.8253 \times 10^{-7}$
$A_8 = -2.2671 \times 10^{-8}$, $A_{10} = 1.2615 \times 10^{-10}$

NUMERICAL EXAMPLE 4

A numerical example of another embodiment of the present invention shown in FIG. 1, which is of the rear focus type and in which the fifth lens group 5 is adapted to perform the focusing function, is set forth below. This example is obtained for a zoom lens system having $f=8.8-48.5$ and $F=1.4$.

| | | | |
|---|---|---|---|
| $r_1 = 53.42$, | $d_1 = 0.90$, | $n_1 = 1.8467$, | $v_1 = 23.9$ |
| $r_2 = 28.80$, | $d_2 = 5.83$, | $n_2 = 1.5891$, | $v_2 = 61.3$ |
| $r_3 = -97.26$, | $d_3 = 0.20$ | | |
| $r_4 = 24.92$, | $d_4 = 3.09$, | $n_3 = 1.5891$, | $v_3 = 61.3$ |
| $r_5 = 54.72$, | $d_5 =$ variable | | |
| $r_6 = 23.41$, | $d_6 = 0.85$, | $n_4 = 1.7432$, | $v_4 = 49.3$ |
| $r_7 = 9.879$, | $d_7 = 3.41$ | | |
| $r_8 = -15.37$, | $d_8 = 0.85$, | $n_5 = 1.7432$, | $v_5 = 49.3$ |
| $r_9 = 10.91$, | $d_9 = 2.72$, | $n_6 = 1.8467$, | $v_6 = 23.9$ |
| $r_{10} = 369.0$, | $d_{10} =$ variable | | |
| $r_{11} = -16.05$, | $d_{11} = 0.85$, | $n_7 = 1.7234$, | $v_7 = 38.0$ |
| $r_{12} = -71.76$, | $d_{12} =$ variable | | |
| $r^*_{13} = 17.59$, | $d_{13} = 3.55$, | $n_8 = 1.5891$, | $v_8 = 61.3$ |
| $r_{14} = -48.58$, | $d_{14} = 0.80$ | | |
| $r_{15} = \infty$(iris), | $d_{15} =$ variable | | |
| $r_{16} = 16.24$, | $d_{16} = 4.97$, | $n_9 = 1.4875$, | $v_9 = 70.5$ |
| $r_{17} = -29.03$, | $d_{17} = 0.20$ | | |
| $r_{18} = 17.87$, | $d_{18} = 0.85$, | $n_{10} = 1.8467$, | $v_{10} = 23.9$ |
| $r_{19} = 8.923$, | $d_{19} = 1.19$ | | |
| $r_{20} = 13.42$, | $d_{20} = 3.43$, | $n_{11} = 1.5891$, | $v_{11} = 61.3$ |
| $r_{21} = -119.9$, | $d_{21} =$ variable | | |
| $r_{22} = \infty$, | $d_{22} = 5.78$, | $n_{12} = 1.5231$, | $v_{12} = 58.5$ |
| $r_{23} = \infty$ | | | |

In this example, $d_5$, $d_{10}$ and $d_{12}$ depend upon the focal length $f$. Examples thereof are shown in the Table 3.

TABLE 3

| f (mm) | $d_5$ (mm) | $d_{10}$ (mm) | $d_{12}$ (mm) |
|---|---|---|---|
| 8.8 | 0.54 | 16.32 | 4.92 |
| 31.5 | 15.42 | 1.92 | 4.44 |
| 48.5 | 18.34 | 2.44 | 1.00 |

In the above Table, $d_{15}$ and $d_{21}$ depend upon photographing distance and focal length. Examples thereof are shown in Tables 4 and 5.

TABLE 4

(Photographing distance 4 m)

| f (mm) | $d_{15}$ (mm) | $d_{21}$ (mm) |
|---|---|---|
| 8.8 | 3.18 | 9.67 |
| 31.5 | 2.96 | 9.89 |
| 48.5 | 2.62 | 10.2 |

TABLE 5

(Photographing distance 2 m)

| f (mm) | $d_{15}$ (mm) | $d_{21}$ (mm) |
|---|---|---|
| 8.8 | 3.16 | 9.68 |

TABLE 5-continued (Photographing distance 2 m)

| f (mm) | $d_{15}$ (mm) | $d_{21}$ (mm) |
|---|---|---|
| 31.5 | 2.72 | 10.1 |
| 48.5 | 2.05 | 10.8 |

Aspherical plane coefficients in the above embodiment are as follows:

13th surface: $K = -2.4539$
$A_4 = -6.7380 \times 10^{-5}$, $A_6 = 3.4388 \times 10^{-8}$
$A_8 = 5.2155 \times 10^{-10}$, $A_{10} = -2.6575 \times 10^{-11}$ FIGS. 8 to 10 show aberration characteristics of the embodiment 1 mentioned above when photographing an object at a distance with focal length of 8.8mm, 31.5mm and 48.5mm, respectively, FIGS. 11 to 13 show aberration characteristics thereof when photographing an object at a distance of 4 m with the same focal lengths, respectively and FIGS. 14 to 16 show aberration characteristics when photographing an object at a distance 2 m with the same focal lengths, respectively.

(a) in the characteristics corresponds to a center of light focusing plane, (b) height of light on the focusing plane corresponding to 0.6 times of the maximum view angle at respective focal length and (c) height of light on the focusing plane corresponding to 0.9 times of the maximum view angle, respectively.

In the numerical embodiment 4, values thereof corresponding to the conditions (i), (ii), (iii) and (iv) are as follows:

$d_{IV,V}/f_V = 0.19$ $|f_I/f_{II}| = 3.41$ $|f_I/f_{III}| = 1.34$ $f_I/f_W = 4.37$

The ratio of the total length to the focal length at wide-angle end in the numerical embodiment 4 is 8.47.

NUMERICAL EXAMPLE 5

Figure 37:
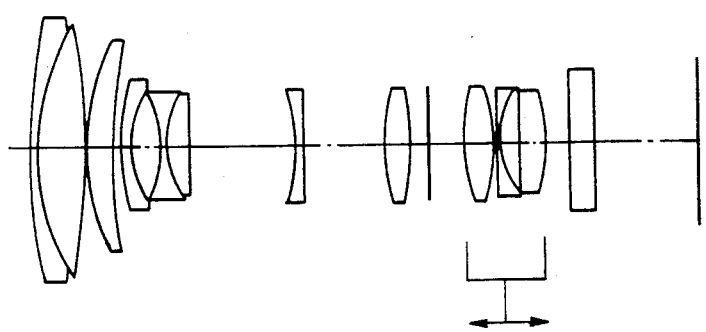
FIGS. 37 to 43 are cross sections showing rear focus type zoom lens constructions of other embodiments of the present invention.

A numerical example of another embodiment of the lens system shown in FIG. 37, which is of the rear focus type, is set forth below. This example is obtained for a zoom lens system having f=9.0–50.7 and F=1.6.

| | | | |
|---|---|---|---|
| $r_1 = 60.45$, | $d_1 = 0.95$, | $n_1 = 1.8467$, | $\nu_1 = 23.9$ |
| $r_2 = 30.55$, | $d_2 = 5.12$, | $n_2 = 1.5891$, | $\nu_2 = 61.3$ |
| $r_3 = -96.98$, | $d_3 = 0.20$ | | |
| $r_4 = 25.33$, | $d_4 = 3.21$, | $n_3 = 1.5891$, | $\nu_3 = 61.3$ |
| $r_5 = 70.01$, | $d_5 =$ variable | | |
| $r_6 = 23.69$, | $d_6 = 0.85$, | $n_4 = 1.7432$, | $\nu_4 = 49.3$ |
| $r_7 = 10.50$, | $d_7 = 3.478$ | | |
| $r_8 = 16.02$, | $d_8 = 0.85$, | $n_5 = 1.7432$, | $\nu_5 = 49.3$ |
| $r_9 = 11.96$, | $d_9 = 2.42$, | $n_6 = 1.8467$, | $\nu_6 = 23.9$ |
| $r_{10} = -1883$, | $d_{10} =$ variable | | |
| $r_{11} = -16.14$, | $d_{11} = 0.85$, | $n_7 = 1.7352$, | $\nu_7 = 41.1$ |
| $r_{12} = -105.3$, | $d_{12} =$ variable | | |
| $r^*_{13} = 33.28$, | $d_{13} = 2.48$, | $n_8 = 1.6968$, | $\nu_8 = 55.5$ |
| $r_{14} = -21.28$, | $d_{14} = 2.25$ | | |
| $r_{15} = \infty$ (iris), | $d_{15} =$ variable | | |
| $r_{16} = 20.16$, | $d_{16} = 3.21$, | $n_9 = 1.5891$, | $\nu_9 = 61.3$ |
| $r_{17} = -28.70$, | $d_{17} = 0.30$ | | |
| $r_{18} = 83.37$, | $d_{18} = 0.90$, | $n_{10} = 1.8052$, | $\nu_{10} = 25.4$ |
| $r_{19} = 11.07$, | $d_{19} = 1.61$ | | |
| $r_{20} = 28.88$, | $d_{20} = 3.00$, | $n_{11} = 1.5891$, | $\nu_{11} = 61.3$ |
| $r^*_{21} = -19.75$, | $d_{21} =$ variable | | |
| $r_{22} = \infty$ | $d_{22} = 2.76$, | $n_{12} = 1.5231$, | $\nu_{12} = 58.5$ |
| $r_{23} = \infty$ | | | |

In this example, $d_5$, $d_{10}$ and $d_{12}$ depend upon the focal length f. Examples thereof are shown in the Table 6.

TABLE 6

| f(mm) | $d_5$ (mm) | $d_{10}$ (mm) | $d_{12}$ (mm) |
|---|---|---|---|
| 9.0 | 0.74 | 12.43 | 9.25 |
| 32.6 | 15.37 | 0.51 | 6.52 |
| 50.7 | 18.10 | 2.35 | 1.95 |

In the above Table, $d_{15}$ and $d_{21}$ depend upon photographing distance and focal length. Examples thereof are shown in Tables 7 and 8.

TABLE 7

(Photographing distance 4 m)

| f(mm) | $d_{15}$ (mm) | $d_{21}$ (mm) |
|---|---|---|
| 9.0 | 4.07 | 5.51 |
| 32.6 | 3.80 | 5.78 |
| 50.7 | 3.40 | 6.18 |

TABLE 8

(Photographing distance 2 m)

| f(mm) | $d_{15}$ (mm) | $d_{21}$ (mm) |
|---|---|---|
| 9.0 | 4.05 | 5.53 |
| 32.6 | 3.53 | 6.05 |
| 50.7 | 2.75 | 6.83 |

Aspherical plane coefficients in the above embodiment are as follows:

| 13th surface: | $K = -17.642$ | |
| | $A_4 = -4.2365 \times 10^{-5}$, | $A_6 = -5.5831 \times 10^{-7}$ |
| | $A_8 = 6.1776 \times 10^{-9}$, | $A_{10} = -5.2763 \times 10^{-11}$ |
| 21st surface: | $K = -0.7289$, | |
| | $A_4 = -2.1001 \times 10^{-5}$, | $A_6 = 1.5507 \times 10^{-6}$ |
| | $A_8 = -1.1763 \times 10^{-7}$, | $A_{10} = 1.8830 \times 10^{-9}$ |

In the numerical embodiment 5 mentioned above, values thereof corresponding to the conditions (i), (ii), (iii) and (iv) are as follows:

$d_{IV,V}/f_V = 0.24$ $|f_I/f_{II}| = 3.00$ $|f_I/f_{III}| = 1.45$ $f_I/f_W = 4.20$

The ratio of the total length to the focal length at wide-angle end in the numerical embodiment 5 is 8.23.

NUMERICAL EXAMPLE 6

Figure 38:
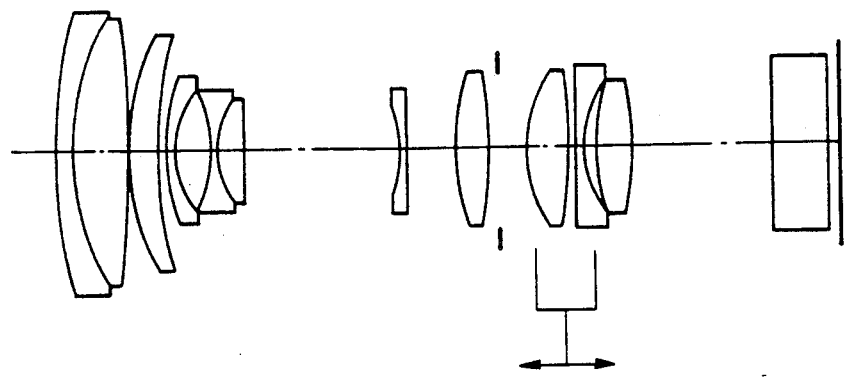

A numerical example of another embodiment of the present invention shown in FIG. 38 is set forth below. This example is obtained for a zoom lens system having f=8.8–48.4 and F=1.4.

| | | | |
|---|---|---|---|
| $r_1 = 56.46$, | $d_1 = 0.90$, | $n_1 = 1.8467$, | $\nu_1 = 23.9$ |
| $r_2 = 30.60$, | $d_2 = 5.58$, | $n_2 = 1.5891$, | $\nu_2 = 61.3$ |
| $r_3 = -98.75$, | $d_3 = 0.20$ | | |
| $r_4 = 24.64$, | $d_4 = 3.18$, | $n_3 = 1.5891$, | $\nu_3 = 61.3$ |
| $r_5 = 56.26$, | $d_5 =$ variable | | |
| $r_6 = 23.28$, | $d_6 = 0.85$, | $n_4 = 1.7432$, | $\nu_4 = 49.3$ |
| $r_7 = 9.96$, | $d_7 = 3.37$ | | |
| $r_8 = -15.56$, | $d_8 = 0.85$, | $n_5 = 1.7432$, | $\nu_5 = 49.3$ |

-continued

| | | | |
|---|---|---|---|
| $r_9 = 11.60$, | $d_9 = 2.57$, | $n_6 = 1.8467$, | $v_6 = 23.9$ |
| $r_{10} = 365.5$, | $d_{10} = $ variable | | |
| $r_{11} = -16.61$, | $d_{11} = 0.85$, | $n_7 = 1.7352$, | $v_7 = 41.1$ |
| $r_{12} = -79.36$, | $d_{12} = $ variable | | |
| $r^*_{13} = 22.45$, | $d_{13} = 2.99$ | $n_8 = 1.5891$, | $v_8 = 61.3$ |
| $r_{14} = -30.13$, | $d_{14} = 0.80$ | | |
| $r_{15} = \infty$ (iris), | $d_{15} = $ variable | | |
| $r_{16} = 18.13$, | $d_{16} = 3.76$, | $n_9 = 1.7130$, | $v_9 = 53.9$ |
| $r_{17} = -64.90$, | $d_{17} = 0.20$ | | |
| $r_{18} = 133.9$, | $d_{18} = 0.85$, | $n_{10} = 1.8052$, | $v_{10} = 25.4$ |
| $r_{19} = 11.65$, | $d_{19} = 1.43$ | | |
| $r_{20} = 23.02$, | $d_{20} = 3.95$, | $n_{11} = 1.5891$, | $v_{11} = 61.3$ |
| $r^*_{21} = -16.83$, | $d_{21} = $ variable | | |
| $r_{22} = \infty$, | $d_{22} = 2.76$ | $n_{12} = 1.5231$, | $v_{12} = 58.5$ |
| $r_{23} = \infty$ | | | |

In this example, $d_5$, $d_{10}$ and $d_{12}$ depend upon the focal length f. Examples thereof are shown in the Table 9.

TABLE 9

| f(mm) | $d_5$ (mm) | $d_{10}$ (mm) | $d_{12}$ (mm) |
|---|---|---|---|
| 8.8 | 0.54 | 15.93 | 5.34 |
| 18.4 | 10.28 | 5.25 | 6.28 |
| 48.4 | 18.19 | 2.62 | 1.00 |

In the above Table, $d_{15}$ and $d_{21}$ depend upon photographing distance and focal length. Examples thereof are shown in Tables 10 and 11.

TABLE 10

| (Photographing distance 4 m) | | |
|---|---|---|
| f (mm) | $d_{15}$ (mm) | $d_{21}$ (mm) |
| 8.8 | 3.14 | 15.02 |
| 18.4 | 3.08 | 15.08 |
| 48.4 | 2.58 | 15.58 |

TABLE 11

| (Photographing distance 2 m) | | |
|---|---|---|
| f (mm) | $d_{15}$ (mm) | $d_{21}$ (mm) |
| 8.8 | 3.12 | 15.04 |
| 18.4 | 2.99 | 15.17 |
| 48.4 | 2.02 | 16.14 |

Aspherical plane coefficients in the above embodiment are as follows:

13th surface: $K = -7.6074$,
$A_4 = -4.3604 \times 10^{-5}$, $A_6 = -1.8207 \times 10^{-7}$
$A_8 = -6.3223 \times 10^{-10}$, $A_{10} = -3.1962 \times 10^{-11}$ 21st surface: $K = -0.2864$,
$A_4 = 1.4695 \times 10^{-5}$, $A_6 = -2.6289 \times 10^{-7}$
$A_8 = -4.7793 \times 10^{-9}$, $A_{10} = -1.8961 \times 10^{-11}$ In the numerical embodiment 3 mentioned above, values thereof corresponding to the conditions (i), (ii), (iii) and (iv) are as follows:

$d_{IV,V}/f_V = 0.184$ $|f_I/f_{ii}| = 3.36$ $|f_I/f_{III}| = 1.33$ $f_I/f_W = 4.35$

The ratio of the total length to the focal length at wide-angle end in the numerical embodiment 6 is 8.52.

NUMERICAL EXAMPLE 7

Figure 39:
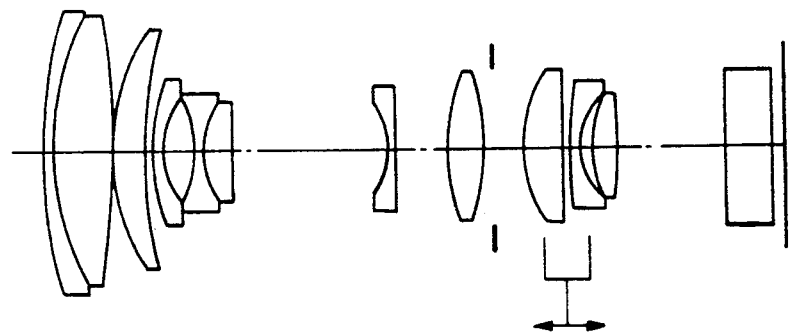

A numerical example of another embodiment of the present invention shown in FIG. 39, which is of the rear focus type, is as follows. This is a case of a zoom lens of f=8.9–48.9 and F=1.4.

| | | | |
|---|---|---|---|
| $r_1 = 56.53$, | $d_1 = 0.90$, | $n_1 = 1.8467$, | $v_1 = 23.9$ |
| $r_2 = 30.55$, | $d_2 = 5.58$, | $n_2 = 1.5891$, | $v_2 = 61.3$ |
| $r_3 = -98.83$, | $d_3 = 0.20$ | | |
| $r_4 = 24.64$, | $d_4 = 3.18$, | $n_3 = 1.5891$, | $v_3 = 61.3$ |
| $r_5 = 56.13$, | $d_5 = $ variable | | |
| $r_6 = 23.28$, | $d_6 = 0.85$, | $n_4 = 1.7432$, | $v_4 = 49.3$ |
| $r_7 = 10.01$, | $d_7 = 3.37$ | | |
| $r_8 = -15.46$, | $d_8 = 0.85$, | $n_5 = 1.7432$, | $v_5 = 49.3$ |
| $r_9 = 11.61$, | $d_9 = 2.57$, | $n_6 = 1.8467$, | $v_6 = 23.9$ |
| $r_{10} = 330.0$, | $d_{10} = $ variable | | |
| $r_{11} = -16.65$, | $d_{11} = 0.85$, | $n_7 = 1.7352$, | $v_7 = 41.1$ |
| $r_{12} = -78.40$, | $d_{12} = $ variable | | |
| $r^*_{13} = 14.87$, | $d_{13} = 3.80$, | $n_8 = 1.5891$, | $v_8 = 61.3$ |
| $r_{14} = -31.54$, | $d_{14} = 0.80$ | | |
| $r_{15} = \infty$ (iris), | $d_{15} = $ variable | | |
| $r_{16} = 14.18$, | $d_{16} = 4.05$, | $n_9 = 1.7130$, | $v_9 = 53.9$ |
| $r_{17} = -112.2$, | $d_{17} = 0.20$ | | |
| $r_{18} = 52.07$, | $d_{18} = 0.85$, | $n_{10} = 1.8052$, | $v_{10} = 25.4$ |
| $r_{19} = 8.527$, | $d_{19} = 1.08$ | | |
| $r_{20} = 13.85$, | $d_{20} = 2.55$, | $n_{11} = 1.5891$, | $v_{11} = 61.3$ |
| $r^*_{21} = -44.88$, | $d_{21} = $ variable | | |
| $r_{22} = \infty$, | $d_{22} = 5.78$, | $n_{12} = 1.5231$, | $v_{12} = 58.5$ |
| $r_{23} = \infty$ | | | |

In the above embodiment, $d_5$, $d_{10}$ and $d_{12}$ depend upon focal length f. Examples are shown in the Table 12.

TABLE 12

| f(mm) | $d_5$ (mm) | $d_{10}$ (mm) | $d_{12}$ (mm) |
|---|---|---|---|
| 8.9 | 0.54 | 16.00 | 5.27 |
| 32.2 | 15.42 | 1.86 | 4.53 |
| 48.9 | 18.23 | 2.58 | 1.00 |

In this embodiment, $d_{15}$ and $d_{21}$ depend upon photographing distance and focal length f. Examples are shown in Tables 13 and 14.

TABLE 13

| (Photographing distance 4 m) | | |
|---|---|---|
| f(mm) | $d_{15}$ (mm) | $d_{21}$ (mm) |
| 8.9 | 3.14 | 10.43 |
| 32.2 | 2.89 | 10.68 |
| 48.9 | 2.53 | 11.04 |

TABLE 14

| (Photographing distance 2 m) | | |
|---|---|---|
| f(mm) | $d_{15}$ (mm) | $d_{21}$ (mm) |
| 8.9 | 3.12 | 10.45 |
| 32.2 | 2.62 | 10.95 |
| 48.9 | 1.92 | 11.65 |

Aspheric plane coefficients in the above embodiment are shown below.

13th surface: $K = -0.9727$,
$A_4 = -9.4071 \times 10^{-5}$, $A_6 = 1.3100 \times 10^{-7}$
$A_8 = 2.4170 \times 10^{-9}$, $A_{10} = -3.8505 \times 10^{-11}$ 21st surface: $K = -1.2444$
$A_4 = 2.8463 \times 10^{-5}$, $A_6 = 1.8552 \times 10^{-6}$
$A_8 = -4.1188 \times 10^{-8}$, $A_{10} = -5.9132 \times 10^{-10}$ In the numerical embodiment 7 mentioned above values thereof corresponding to the conditions (i), (ii), (iii) and (iv) are as follows:

$d_{IV,V}/f_V = 0.146$ $|f_I/f_{II}| = 3.37$ $f_I/f_{III} = 1.32$ $f_I/f_W = 4.30$

The ratio of the total length to the focal length at wide-angle end in the numerical embodiment 7 is 7.98.

NUMERICAL EXAMPLE 8

Figure 40:
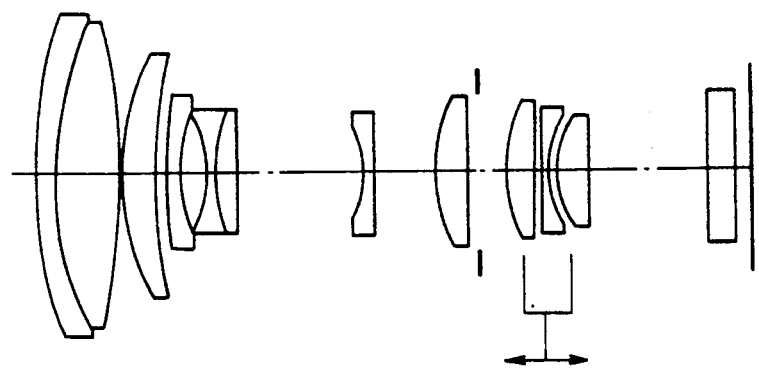

A numerical example of another embodiment of the present invention shown in FIG. 40, which of the rear focus 8.8-48.4 and F=1.4.

| | | | |
|---|---|---|---|
| $r_1 = 50.12$, | $d_1 = 0.90$, | $n_1 = 1.8467$, | $v_1 = 23.9$ |
| $r_2 = 29.79$, | $d_2 = 6.66$, | $n_2 = 1.5891$, | $v_2 = 61.3$ |
| $r_3 = -92.66$, | $d_3 = 0.20$ | | |
| $r_4 = 21.46$, | $d_4 = 3.36$, | $n_3 = 1.5891$, | $v_3 = 61.3$ |
| $r_5 = 43.46$, | $d_5 = $ variable | | |
| $r_6 = 41.31$, | $d_6 = 0.85$, | $n_4 = 1.7432$, | $v_4 = 49.3$ |
| $r_7 = 11.63$, | $d_7 = 2.98$ | | |
| $r_8 = -18.81$, | $d_8 = 0.85$, | $n_5 = 1.7432$, | $v_5 = 49.3$ |
| $r_9 = 13.91$, | $d_9 = 2.25$, | $n_6 = 1.8467$, | $v_6 = 23.9$ |
| $r_{10} = 92.72$, | $d_{10} = $ variable | | |
| $r_{11} = -12.07$, | $d_{11} = 0.85$, | $n_7 = 1.7352$, | $v_7 = 41.1$ |
| $r_{12} = -50.70$, | $d_{12} = $ variable | | |
| $r_{13}^* = 11.27$, | $d_{13} = 3.78$, | $n_8 = 1.5891$, | $v_8 = 61.3$ |
| $r_{14} = \infty$, | $d_{14} = 0.80$ | | |
| $r_{15} = \infty$(iris), | $d_{15} = $ variable | | |
| $r_{16} = 13.37$, | $d_{16} = 3.23$, | $n_9 = 1.6968$, | $v_9 = 55.5$ |
| $r_{17} = 552.2$, | $d_{17} = 0.20$ | | |
| $r_{18} = 162.8$, | $d_{18} = 0.85$, | $n_{10} = 1.8052$, | $v_{10} = 25.4$ |
| $r_{19} = 10.53$, | $d_{19} = 0.77$ | | |
| $r_{20} = 9.645$, | $d_{20} = 2.79$, | $n_{11} = 1.6584$, | $v_{11} = 50.9$ |
| $r_{21}^* = -300.1$, | $d_{21} = $ variable | | |
| $r_{22} = \infty$, | $d_{22} = 2.76$, | $n_{12} = 1.5231$, | $v_{12} = 58.5$ |
| $r_{23} = \infty$ | | | |

In the above embodiment, $d_5$, $d_{10}$ and $d_{12}$ depend upon focal length f. Examples are shown in the Table 15.

TABLE 15

| f (mm) | $d_5$ (mm) | $d_{10}$ (mm) | $d_{12}$ (mm) |
|---|---|---|---|
| 8.8 | 1.20 | 13.31 | 5.94 |
| 33.6 | 14.13 | 2.52 | 3.80 |
| 48.4 | 16.07 | 3.39 | 1.00 |

In this embodiment, $d_{15}$ and $d_{21}$ depend upon photographing distance and focal length f. Examples are shown in Tables 16 and 17.

TABLE 16

| (Photographing distance 4 m) | | |
|---|---|---|
| f (mm) | $d_{15}$ (mm) | $d_{21}$ (mm) |
| 8.8 | 2.84 | 9.02 |
| 33.6 | 2.58 | 9.28 |
| 48.4 | 2.28 | 9.58 |

TABLE 17

| (Photographing distance 2 m) | | |
|---|---|---|
| f (mm) | $d_{15}$ (mm) | $d_{21}$ (mm) |
| 8.8 | 2.82 | 9.04 |
| 33.6 | 2.31 | 9.55 |
| 48.4 | 1.72 | 10.14 |

Aspheric plane coefficients in the above embodiment are shown below.

| | |
|---|---|
| 13th surface: | $K = -0.7565$, |
| | $A_4 = -4.3097 \times 10^{-5}$, $A_6 = 2.7697 \times 10^{-7}$ |
| | $A_8 = 1.6271 \times 10^{-9}$, $A_{10} = -2.3119 \times 10^{-11}$ |
| 21st surface: | $K = -418.00$ |
| | $A_4 = 3.0423 \times 10^{-4}$, $A_6 = 4.6912 \times 10^{-6}$ |
| | $A_8 = -1.6911 \times 10^{-7}$, $A_{10} = 2.9879 \times 10^{-9}$ |

In the numerical embodiment 8 mentioned above, values thereof corresponding to the conditions (i), (ii), (iii) and (iv) are as follows:

$d_{IV,V}/f_V = 0.185$ $|f_I/f_{II}| = 3.22$ $|f_I/f_{III}| = 1.60$ $f_I/f_W = 3.94$

The ratio of the total length to the focal length at wide-angle end in the numerical embodiment 8 is 7.90.

NUMERICAL EXAMPLE 9

Figure 41:
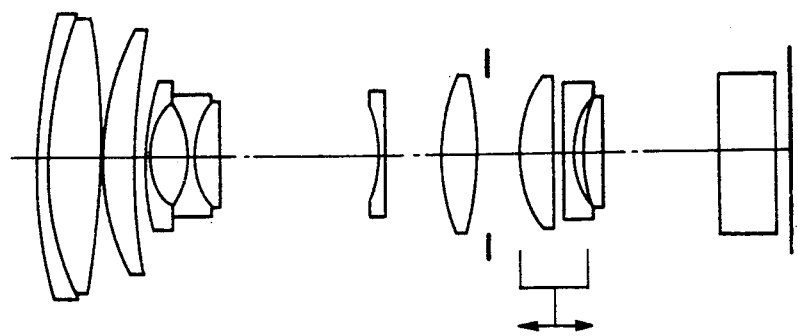

A numerical example of another embodiment of the present invention shown in FIG. 41, which is of the rear focus type, is as follows. This is a case of a zoom lens of f=9.0–49.6 and F=1.4.

| | | | |
|---|---|---|---|
| $r_1 = 56.53$, | $d_1 = 0.90$, | $n_1 = 1.8467$, | $v_1 = 23.9$ |
| $r_2 = 30.55$, | $d_2 = 5.58$, | $n_2 = 1.5891$, | $v_2 = 61.3$ |
| $r_3 = -98.83$, | $d_3 = 0.20$ | | |
| $r_4 = 24.64$, | $d_4 = 3.18$, | $n_3 = 1.5891$, | $v_3 = 61.3$ |
| $r_5 = 56.13$, | $d_5 = $ variable | | |
| $r_6 = 23.28$, | $d_6 = 0.85$, | $n_4 = 1.7432$, | $v_4 = 49.3$ |
| $r_7 = 10.01$, | $d_7 = 3.37$ | | |
| $r_8 = -15.46$, | $d_8 = 0.85$, | $n_5 = 1.7432$, | $v_5 = 49.3$ |
| $r_9 = 11.61$, | $d_9 = 2.57$, | $n_6 = 1.8467$, | $v_6 = 23.9$ |
| $r_{10} = 330.0$, | $d_{10} = $ variable | | |
| $r_{11} = -16.65$, | $d_{11} = 0.85$, | $n_7 = 1.7352$, | $v_7 = 41.1$ |
| $r_{12} = -78.40$, | $d_{12} = $ variable | | |
| $r^*_{13} = 16.52$, | $d_{13} = 3.80$, | $n_8 = 1.5891$, | $v_8 = 61.3$ |
| $r_{14} = -37.60$, | $d_{14} = 0.80$ | | |
| $r_{15} = \infty$(iris), | $d_{15} = $ variable | | |
| $r_{16} = 14.00$, | $d_{16} = 4.05$, | $n_9 = 1.7130$, | $v_9 = 53.9$ |
| $r_{17} = -108.5$, | $d_{17} = 0.20$ | | |
| $r_{18} = 57.38$, | $d_{18} = 0.85$, | $n_{10} = 1.8052$, | $v_{10} = 25.4$ |
| $r_{19} = 9.350$, | $d_{19} = 1.08$ | | |
| $r^*_{20} = 13.80$, | $d_{20} = 2.55$, | $n_{11} = 1.5891$, | $v_{11} = 61.3$ |
| $r_{21} = -52.19$, | $d_{21} = $ variable | | |
| $r_{22} = \infty$, | $d_{22} = 5.78$, | $n_{12} = 1.5231$, | $v_{12} = 58.5$ |
| $r_{23} = \infty$ | | | |

In the above embodiment, $d_5$, $d_{10}$ and $d_{12}$ depend upon focal length f. Examples are shown in the Table 18.

TABLE 18

| f(mm) | $d_5$ (mm) | $d_{10}$ (mm) | $d_{12}$ (mm) |
|---|---|---|---|
| 9.0 | 0.54 | 16.00 | 5.27 |
| 32.6 | 15.42 | 1.86 | 4.53 |
| 49.6 | 18.23 | 2.58 | 1.00 |

In this embodiment, $d_{15}$ and $d_{21}$ depend upon photographing distance and focal length f. Examples are shown in Tables 19 and 20.

TABLE 19

| (Photographing distance 4 m) | | |
|---|---|---|
| f(mm) | $d_{15}$ (mm) | $d_{21}$ (mm) |
| 9.0 | 3.14 | 7.27 |

TABLE 19-continued

| | (Photographing distance 4 m) | |
|---|---|---|
| f(mm) | $d_{15}$ (mm) | $d_{21}$ (mm) |
| 32.6 | 2.89 | 7.52 |
| 49.6 | 2.54 | 7.87 |

TABLE 20

| | (Photographing distance 2 m) | |
|---|---|---|
| f(mm) | $d_{15}$ (mm) | $d_{21}$ (mm) |
| 9.0 | 3.12 | 7.29 |
| 32.6 | 2.64 | 7.77 |
| 49.6 | 1.95 | 8.46 |

Aspheric plane coefficients in the above embodiment are shown below.

| 13th surface: | $K = -1.5991$, | | |
|---|---|---|---|
| | $A_4 = -5.4232 \times 10^{-5}$, | $A_6 = 6.6846 \times 10^{-8}$ | |
| | $A_8 = -6.1269 \times 10^{-10}$, | $A_{10} = -8.2479 \times 10^{-13}$ | |
| 21st surface: | $K = -0.8394$, | | |
| | $A_4 = -4.9824 \times 10^{-5}$, | $A_6 = 7.0442 \times 10^{-7}$ | |
| | $A_8 = -1.0475 \times 10^{-8}$, | $A_{10} = 1.0162 \times 10^{-11}$ | |

In the numerical embodiment 9 mentioned above, values thereof corresponding to the conditions (i), (ii), (iii) and (iv) are as follows:

$$d_{IV,V}/f_V = 0.165$$

$$|f_I/f_{II}| = 3.37$$

$$|f_I/f_{III}| = 1.32$$

$$f_I/f_W = 4.25$$

The ratio of the total length to the focal length a wide-angle end in the numerical embodiment 9 is 8.02.

NUMERICAL EXAMPLE 10

Figure 42:
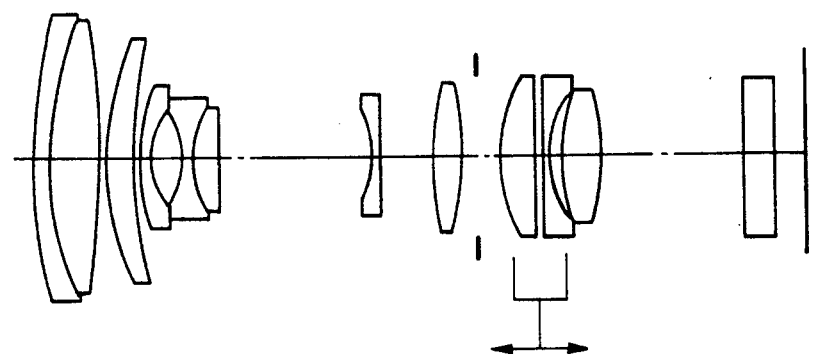

A numerical example of another embodiment of the present invention shown in FIG. 42, which is of the rear focus type, is as follows. This is a case of a zoom lens of f=8.9–49.0 and F=1.4.

| $r_1 = 56.46$, | $d_1 = 0.90$, | $n_1 = 1.8467$, | $\nu_1 = 23.9$ |
|---|---|---|---|
| $r_2 = 30.60$, | $d_2 = 5.45$, | $n_2 = 1.5891$, | $\nu_2 = 61.3$ |
| $r_3 = -98.72$, | $d_3 = 0.20$ | | |
| $r_4 = 24.65$, | $d_4 = 3.20$, | $n_3 = 1.5891$, | $\nu_3 = 61.3$ |
| $r_5 = 56.35$, | $d_5 =$ variable | | |
| $r_6 = 25.83$, | $d_6 = 0.85$, | $n_4 = 1.7432$, | $\nu_4 = 49.3$ |
| $r_7 = 10.42$, | $d_7 = 3.55$ | | |
| $r_8 = -15.56$, | $d_8 = 0.85$, | $n_5 = 1.7432$, | $\nu_5 = 49.3$ |
| $r_9 = 11.60$, | $d_9 = 2.45$, | $n_6 = 1.8467$, | $\nu_6 = 23.9$ |
| $r_{10} = 365.5$, | $d_{10} =$ variable | | |
| $r_{11} = -16.61$, | $d_{11} = 0.85$, | $n_7 = 1.7352$, | $\nu_7 = 41.1$ |
| $r_{12} = -79.36$, | $d_{12} =$ variable | | |
| $r_{13}^* = 22.66$, | $d_{13} = 2.92$, | $n_8 = 1.5891$, | $\nu_8 = 61.3$ |
| $r_{14} = -30.41$, | $d_{14} = 0.80$ | | |
| $r_{15} = \infty$ (iris), | $d_{15} =$ variable | | |
| $r_{16} = 19.58$, | $d_{16} = 3.52$, | $n_9 = 1.7130$, | $\nu_9 = 53.9$ |
| $r_{17} = -72.97$, | $d_{17} = 0.20$ | | |
| $r_{18} = 78.70$, | $d_{18} = 0.85$, | $n_{10} = 1.8052$, | $\nu_{10} = 25.4$ |
| $r_{19} = 11.69$, | $d_{19} = 1.41$ | | |
| $r_{20} = 23.06$, | $d_{20} = 4.00$, | $n_{11} = 1.5891$, | $\nu_{11} = 61.3$ |
| $r_{21}^* = -16.86$, | $d_{21} =$ variable | | |
| $r_{22} = \infty$, | $d_{22} = 2.76$, | $n_{12} = 1.5231$, | $\nu_{12} = 58.5$ |
| $r_{23} = \infty$ | | | |

In the above embodiment, $d_5$, $d_{10}$ and $d_{12}$ depend upon focal length f. Examples are shown in the Table 21.

TABLE 21

| f (mm) | $d_5$ (mm) | $d_{10}$ (mm) | $d_{12}$ (mm) |
|---|---|---|---|
| 8.9 | 0.63 | 15.54 | 5.41 |
| 32.9 | 15.56 | 1.58 | 4.45 |
| 49.0 | 18.19 | 2.40 | 1.00 |

In this embodiment, $d_{15}$ and $d_{21}$ depend upon photographing distance and focal length f. Examples are shown in Tables 22 and 23.

TABLE 22

| | (Photographing distance 4 m) | |
|---|---|---|
| f (mm) | $d_{15}$ (mm) | $d_{21}$ (mm) |
| 8.9 | 3.13 | 9.87 |
| 32.9 | 2.89 | 10.11 |
| 49.0 | 2.56 | 10.44 |

TABLE 23

| | (Photographing distance 2 m) | |
|---|---|---|
| f (mm) | $d_{15}$ (mm) | $d_{21}$ (mm) |
| 8.9 | 3.11 | 9.89 |
| 32.9 | 2.63 | 10.37 |
| 49.0 | 1.99 | 11.01 |

Aspheric plane coefficients in the above embodiment are shown below.

| 13th surface: | $K = -8.7423$, | | |
|---|---|---|---|
| | $A_4 = -3.5619 \times 10^{-5}$, | $A_6 = -1.7166 \times 10^{-7}$ | |
| | $A_8 = -3.9764 \times 10^{-9}$, | $A_{10} = -6.5280 \times 10^{-12}$ | |
| 21st surface: | $K = -0.2050$ | | |
| | $A_4 = 1.3388 \times 10^{-5}$, | $A_6 = -5.1330 \times 10^{-7}$ | |
| | $A_8 = -1.4074 \times 10^{-9}$, | $A_{10} = -5.3122 \times 10^{-11}$ | |

In the numerical embodiment 10 mentioned above, values thereof corresponding to the conditions (i), (ii), (iii) and (iv) are as follows:

$$d_{IV,V}/f_V = 0.184$$

$$|f_I/f_{II}| = 3.37$$

$$|f_I/f_{III}| = 1.33$$

$$f_I/f_W = 4.29$$

The ratio of the total length to the focal length at wide-angle end in the numerical embodiment 10 is 8.41.

NUMERICAL EXAMPLE 11

Figure 43:
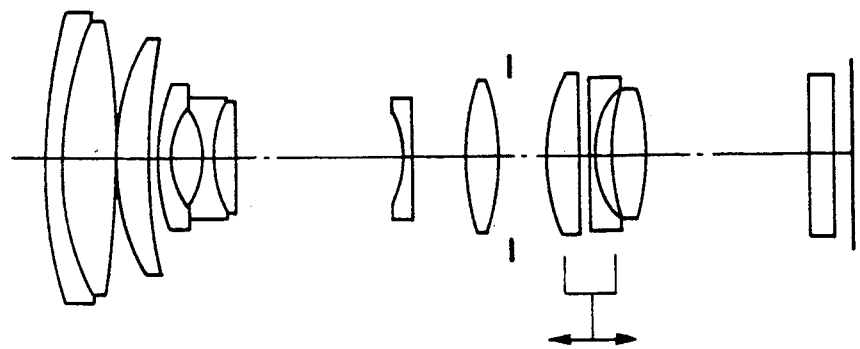

A numerical example of another embodiment of the present invention shown in FIG. 43, which is of the rear focus type, is as follows. This is a case of a zoom lens of f=9.0–49.6 and F=1.4.

| $r_1 = 59.28$, | $d_1 = 0.90$, | $n_1 = 1.8467$, | $\nu_1 = 23.9$ |
|---|---|---|---|
| $r_2 = 32.13$, | $d_2 = 5.86$, | $n_2 = 1.5891$, | $\nu_2 = 61.3$ |
| $r_3 = -103.7$, | $d_3 = 0.20$ | | |
| $r_4 = 25.88$, | $d_4 = 3.34$, | $n_3 = 1.5891$, | $\nu_3 = 61.3$ |
| $r_5 = 59.08$, | $d_5 =$ variable | | |
| $r_6 = 24.44$, | $d_6 = 0.85$, | $n_4 = 1.7432$, | $\nu_4 = 49.3$ |
| $r_7 = 10.46$, | $d_7 = 3.54$ | | |
| $r_8 = -16.34$, | $d_8 = 0.85$, | $n_5 = 1.7432$, | $\nu_5 = 49.3$ |
| $r_9 = 12.18$, | $d_9 = 2.70$, | $n_6 = 1.8467$, | $\nu_6 = 23.9$ |
| $r_{10} = 383.8$, | $d_{10} =$ variable | | |
| $r_{11} = -17.44$, | $d_{11} = 0.85$, | $n_7 = 1.7352$, | $\nu_7 = 41.1$ |
| $r_{12} = -83.33$, | $d_{12} =$ variable | | |
| $r_{13}^* = 23.60$, | $d_{13} = 3.19$, | $n_8 = 1.5891$, | $\nu_8 = 61.3$ |
| $r_{14} = -29.84$, | $d_{14} = 0.80$ | | |
| $r_{15} = \infty$ (iris), | $d_{15} =$ variable | | |

-continued

| | | | |
|---|---|---|---|
| $r_{16} = 18.15$, | $d_{16} = 3.76$, | $n_9 = 1.7130$, | $\nu_9 = 53.9$ |
| $r_{17} = -64.61$, | $d_{17} = 0.20$ | | |
| $r_{18} = 130.4$, | $d_{18} = 0.85$, | $n_{10} = 1.8052$, | $\nu_{10} = 25.4$ |
| $r_{19} = 11.64$, | $d_{19} = 1.43$ | | |
| $r_{20} = 22.68$, | $d_{20} = 3.95$, | $n_{11} = 1.5891$, | $\nu_{11} = 61.3$ |
| $r_{21}^* = -18.10$, | $d_{21}$ = variable | | |
| $r_{22} = \infty$ | $d_{22} = 2.76$, | $n_{12} = 1.5231$, | $\nu_{12} = 58.5$ |
| $r_{23} = \infty$ | | | |

In the above embodiment, $d_5$, $d_{10}$ and $d_{12}$ depend upon focal length f. Examples are shown in the Table 24.

TABLE 24

| f (mm) | $d_5$ (mm) | $d_{10}$ (mm) | $d_{12}$ (mm) |
|---|---|---|---|
| 9.0 | 0.57 | 16.80 | 5.53 |
| 32.6 | 16.19 | 1.99 | 4.72 |
| 49.6 | 19.13 | 2.72 | 1.05 |

In this embodiment, $d_{15}$ and $d_{21}$ depend upon photographing distance and focal length f. Examples are shown in Tables 25 and 26.

TABLE 25

| (Photographing distance 4 m) | | |
|---|---|---|
| f (mm) | $d_{15}$ (mm) | $d_{21}$ (mm) |
| 9.0 | 3.98 | 11.02 |
| 32.6 | 3.74 | 11.26 |
| 49.6 | 3.40 | 11.60 |

TABLE 26

| (Photographing distance 2 m) | | |
|---|---|---|
| f (mm) | $d_{15}$ (mm) | $d_{21}$ (mm) |
| 9.0 | 3.96 | 11.04 |
| 32.6 | 3.49 | 11.51 |
| 49.6 | 2.81 | 12.19 |

Aspheric plane coefficients in the above embodiment are shown below.

13th surface: $K = -7.3127$,
$A_4 = -4.0758 \times 10^{-5}$, $A_6 = -1.2858 \times 10^{-7}$
$A_8 = -1.3500 \times 10^{-10}$, $A_{10} = -3.1057 \times 10^{-11}$ 21st surface: $K = -0.3142$,
$A_4 = 1.5319 \times 10^{-5}$, $A_6 = -1.8797 \times 10^{-7}$
$A_8 = -5.4387 \times 10^{-9}$, $A_{10} = 5.6243 \times 10^{-12}$ In the numerical embodiment 11 mentioned above, values thereof corresponding to the conditions (i), (ii), (iii) and (iv) are as follows:

$d_{IV,V}/f_V = 0.215$ $|f_I/f_{II}| = 3.36$ $|f_I/f_{III}| = 1.33$ $f_I/f_W = 4.45$

The ratio of the total length to the focal length at wide-angle end in the numerical embodiment 11 is 8.65.

Since aberration characteristics of each of the fourth to eleventh embodiments is substantially the same as that of the first embodiment, these characteristics are omitted.

As is clear from the embodiments, according to the present invention, in each of which the number of lenses is as small as 11, the ratio of the total length to the focal length at wide-angle end is on the order of 7 to 9 and aberration for zooming and focusing is well compensated.

As described, according to the present invention, a zoom lens is provided, whose zooming ratio is on the order of 6 and F number is 1.4 to 1.8 and whose ratio of the total length to the focal length at wide-angle end is on the order of 7 to 9 and whose aberration is well compensated for.

What is claimed is:

1. A zoom lens system comprising, from an objective sequentially, a first lens group having a positive power, a second lens group and a third lens group both having negative powers and performing a zooming function by moving along an optical axis, a fourth lens group having a positive power and being always stationary, and a fifth lens group having a positive power and having an image forming function, said fourth lens group including a lens at least one surface of which is aspherical, said first lens group being movable as a whole or partially along an optical axis to perform a focusing function.

2. The zoom lens system claimed in claim 1, wherein said fifth lens group comprises, from an object side sequentially a first lens having a positive power, a second meniscus lens having a negative power, and a third lens having a positive power.

3. The zoom lens system claimed in claim 1 or 2, wherein said first lens group said second lens group, and said third lens group satisfy the following conditions:

$2.7 < |f_I/f_{III}| < 3.6$ $1.0 < |f_I/f_{III}| < 1.9$ $3.0 < f_I/f_W < 4.9$ where $f_I$ is a focal length of said first lens group, $f_{II}$ is a focal length of said second lens group, $f_{III}$ is a focal length of said third lens group, and $f_W$ is a focal length of the whole system at a widest zoom lens angle.

4. The zoom lens system claimed in claim 2, wherein said second meniscus lens of said fifth lens group has meniscus-shaped surface having a large curvature on the image side.

5. A zoom lens system comprising, from an objective sequentially, a first lens group having a positive power, a second lens group and a third lens group both having negative powers and performing a zooming function by moving along an optical axis, a fourth lens group having a positive power and being always stationary, and a fifth lens group having a positive power, said fourth lens group including a lens at least one surface of which is aspherical, said fifth lens group being movable as a whole or partially along an optical axis to perform a focusing function.

6. The zoom lens system claimed in claim 5, wherein said fifth lens group comprises, from an object side sequentially, a first lens having a positive power, a second meniscus lens having a negative power, and a third lens having a positive power.

7. The zoom lens system claimed in claim 5 or 6, wherein said fourth lens group (4) and said fifth lens group satisfy the following condition:

$0.13 < d_{IV,V}/f_V < 0.23$ were $d_{IV,V}$ is a distance on an optical axis between a surface of said fourth lens group closest to the focal plane and a surface of said fifth lens group closest to the object when a photographing distance to the object is infinite, and $f_V$ is a focal length of said fifth lens group.

8. The zoom lens system claimed in claim 5, wherein said fifth lens group includes a lens having at least one surface which is aspherical.

9. The zoom lens system claimed in claim 6, wherein said third lens of said fifth lens group (5) has at least one surface which is aspherical.

10. The zoom lens system claimed in claim 5 or 6, wherein said first lens group, said second lens group, and said third lens group satisfy the following conditions:

$$2.7 < |f_I/f_{II}| < 3.6$$

$$1.0 < |f_I/f_{III}| < 1.9$$

$$3.8 < f_I/f_W < 4.9$$

where $f_I$ is a focal length of said first lens group, $f_{II}$ is a focal length of said second lens group, $f_{III}$ is a focal length of said third lens group, and $f_W$ is a focal length of the whole system at a widest zoom lens angle.

11. The zoom lens system claimed in claim 6, wherein said second meniscus lens of said fifth lens group has meniscus-shaped surface having a large curvature on the image side.

* * * * *